(12) United States Patent
Mihan et al.

(10) Patent No.: US 7,776,980 B2
(45) Date of Patent: Aug. 17, 2010

(54) MONOCYCLOPENTADIENYL COMPLEXES

(75) Inventors: Shahram Mihan, Bad Soden (DE); Benno Bildstein, Innsbruck (AT); Georg Steiner, Salzburg (AT)

(73) Assignee: Basell Polyolefine GmbH, Wesseling (DE)

( * ) Notice: Subject to any disclaimer, the term of this patent is extended or adjusted under 35 U.S.C. 154(b) by 370 days.

(21) Appl. No.: 11/887,039

(22) PCT Filed: Mar. 18, 2006

(86) PCT No.: PCT/EP2006/002498

§ 371 (c)(1), (2), (4) Date: Sep. 24, 2007

(87) PCT Pub. No.: WO2006/100004

PCT Pub. Date: Sep. 28, 2006

(65) Prior Publication Data

US 2009/0018292 A1    Jan. 15, 2009

Related U.S. Application Data

(60) Provisional application No. 60/682,357, filed on May 18, 2005.

(30) Foreign Application Priority Data

Mar. 24, 2005    (DE) .................. 10 2005 014 395

(51) Int. Cl.
| | | |
|---|---|---|
| C08F 4/78 | (2006.01) | |
| C08F 4/76 | (2006.01) | |
| B01J 31/34 | (2006.01) | |
| B01J 31/38 | (2006.01) | |
| C07F 17/00 | (2006.01) | |

(52) U.S. Cl. .................. 526/172; 526/161; 526/169; 526/169.2; 526/904; 526/941; 526/943; 502/103; 556/52; 556/58; 556/42

(58) Field of Classification Search .................. 556/52, 556/58; 502/103; 526/172, 169, 161, 904
See application file for complete search history.

(56) References Cited

U.S. PATENT DOCUMENTS

| | | | |
|---|---|---|---|
| 3,242,150 A | 3/1966 | Scoggin | |
| 3,248,179 A | 4/1966 | Norwood | |
| 3,709,853 A | 1/1973 | Karapinka | |
| 4,015,059 A | 3/1977 | Karol | |
| 5,698,642 A | 12/1997 | Govoni et al. | |
| 6,218,489 B1 * | 4/2001 | Riedel et al. .................. 526/161 |
| 6,255,418 B1 | 7/2001 | Jolly et al. | |
| 6,391,817 B1 * | 5/2002 | Brinen .................. 502/117 |
| 6,413,477 B1 | 7/2002 | Govoni et al. | |
| 6,417,302 B1 | 7/2002 | Bohnen | |
| 6,437,161 B1 | 8/2002 | Mihan et al. | |
| 6,589,905 B1 | 7/2003 | Fischer et al. | |
| 6,699,948 B2 | 3/2004 | Mihan et al. | |
| 6,723,675 B1 * | 4/2004 | Wang .................. 502/103 |
| 6,784,261 B1 | 8/2004 | Schopf et al. | |
| 6,787,498 B2 | 9/2004 | Mihan et al. | |
| 6,812,185 B2 | 11/2004 | Fischer et al. | |
| 6,815,514 B2 * | 11/2004 | Andell et al. .................. 526/160 |
| 6,838,563 B2 | 1/2005 | Mihan et al. | |
| 6,919,412 B1 | 7/2005 | Mihan et al. | |
| 6,946,568 B2 | 9/2005 | Kristen et al. | |
| 7,045,644 B2 | 5/2006 | Schopf et al. | |
| 7,053,160 B1 | 5/2006 | Bingel et al. | |
| 7,238,818 B2 | 7/2007 | Ewen et al. | |
| 2003/0225275 A1 | 12/2003 | Andell et al. | |
| 2004/0242880 A1 | 12/2004 | Mihan et al. | |
| 2007/0155918 A1 | 7/2007 | Mihan et al. | |

FOREIGN PATENT DOCUMENTS

| | | |
|---|---|---|
| DE | 19710615 | 9/1998 |
| DE | 10107045 | 8/2002 |
| EP | 662484 | 7/1995 |
| EP | 1212333 | 6/2002 |
| JP | 2004-189690 A * | 7/2004 |
| WO | 91/09882 | 7/1991 |
| WO | 96/00243 | 1/1996 |
| WO | 96/13529 | 5/1996 |
| WO | 97/04015 | 2/1997 |
| WO | 97/36937 | 10/1997 |
| WO | 98/22486 | 5/1998 |
| WO | 98/27124 | 6/1998 |
| WO | 98/40419 | 9/1998 |
| WO | 99/06414 | 2/1999 |
| WO | 00/05277 | 2/2000 |
| WO | 00/24787 | 5/2000 |

(Continued)

OTHER PUBLICATIONS

Alcalde et al., Organometallics, 2001, 20, 4623-4631.*

(Continued)

Primary Examiner—Rip A. Lee
(74) Attorney, Agent, or Firm—Jarrod N. Raphael

(57) ABSTRACT

Monocyclopentadienyl complexes in which the cyclopentadienyl system bears at least one bridged keto, thioketo, imino or phosphino group, a catalyst system comprising at least one of the monocyclopentadienyl complexes and a process for preparing polyolefins by polymerization or copolymerization of olefins in the presence of the catalyst system.

5 Claims, No Drawings

FOREIGN PATENT DOCUMENTS

| | | |
|---|---|---|
| WO | 00/31090 | 6/2000 |
| WO | 01/09148 | 2/2001 |
| WO | 01/12641 | 2/2001 |
| WO | 01/41920 | 6/2001 |
| WO | 01/92346 | 12/2001 |
| WO | 02/16374 | 2/2002 |
| WO | 03/024982 | 3/2003 |
| WO | 2004/020479 | 3/2004 |

OTHER PUBLICATIONS

Döhring et al., Organometallics 2000, 19, 388-402.*

Yoshikawa et al. JP2004-189690 (Jul. 2004); translation in English.*

B. Kirk-Othmer, "Olefin Polymers (High Pressure Polyethylene)," *Encyclopedia of Chemical Technology*, vol. 16, p. 402-420 (1981).

A. Döhring et al., "Donor-Ligand Substituted Cyclopentadienylchromium(III) Complexes: A New Class to Alkene Polymerization Catalyst. 1. Amino-Substituted Systems," *Organometallics*, vol. 19(4), p. 388-402 (2000) XP-001125762.

H. Zhang et al., "Synthesis and Characterization of Nitrogen-Functionalized Cyclopentadienylchromium Complexes and Their Use as Catalysts for Olefin Polymerization," *Organometallics*, vol. 23(24), p. 5681-5688 (2004).

Lettau, *Chemie der Heterocyclen*, 1st Edition, VEB, Leipzig, p. 16-29 (1980).

J. Ewen et al., "Expanding the Scope of Metallocene Catalysis: Beyond Indenyl and Fluorenyl Derivatives," *European Journal of Inorganic Chemistry*, Springer, Verlag, p. 150-169 (1999).

R. Halterman, "Synthesis and Applications of Chiral Cyclopentadienylmetal Complexes," *Chem. Rev.*, vol. 92(5), p. 965-994 (1992).

S. Strauss, "The Search for Larger and More Weakly Coordinating Anions," *Chem. Rev.*, vol. 93(3), p. 927-942 (1993).

H. Wiesenfeldt et al., "XVII. Racemic and meso diastereomers of group IV metallocene derivatives with symmetrically substituted, dimethylsilanediyl-bridged ligand frameworks. Crystal structure of R,S-$Me_2Si(3$-t-Bu-5-$MeC_5H_2)_2ZrCl_2$," *Journal of Organometallic Chemistry*, vol. 369, p. 359-370 (1989).

J. Michl, Editor, *Chemical Reviews*, vol. 100(4), p. 1169-1681 (2000).

L. Fieser & M. Fieser, "Heterocyclen," *Lehrbuch der Organischen Chemie*, Verlag Chemie, Weinheim, p. 921-941 (1957).

M. Enders et al., "8-Quinolylcyclopentadienyl, a Ligand with a Tailored Fit for Chelate Complexes," *Chem. Ber.*, vol. 129, p. 459-463 (1996).

P. Jutzi et al., "Cyclopentadienyl compounds with nitrogen donors in the side-chain," *J. of Organometallic Chem.*, vol. 500, p. 175-185 (1995).

B. Small et al., "Highly Active Iron and Cobalt Catalysts for the Polymerization of Ethylene," *J. Am. Chem. Soc.*, vol. 120(16), p. 4049-4050 (1998).

G. Britovsek et al., "Novel olefin polymerization catalysts based on iron and cobalt," *Chem. Commun.*, p. 849-850 (1998).

L. Mao et al., "Homolysis of the LN-N Bond, Synthesis, Characterization and Catalytic Activity of Lanthanide(II) Complexes with 3-Picolyl Functionalized Indenyl Ligands," Poster Presentation, *International Conference on Organometallic Chemistry*, Book of Abstracts, p. 103-105 (Jul. 25, 2004) XP002385908.

* cited by examiner

MONOCYCLOPENTADIENYL COMPLEXES

The present invention relates to monocyclopentadienyl complexes in which the cyclopentadienyl system bears at least one bridged keto, thioketo, imino or phosphino group and to a catalyst system comprising at least one of the monocyclopentadienyl complexes, and also to processes for preparing them.

In addition, the invention relates to a process for preparing polyolefins by polymerization or copolymerization of olefins in the presence of the catalyst system and to polymers obtainable in this way.

Many of the catalysts used for the polymerization of α-olefins are based on immobilized chromium oxides (cf., for example, Kirk-Othmer, "Encyclopedia of Chemical Technology", 1981, Vol. 16, p. 402). These generally give ethylene homopolymers and copolymers having high molecular weights but are relatively insensitive to hydrogen and thus do not allow the molecular weight to be controlled in a simple fashion. In contrast, the molecular weight of polyethylene can be controlled in a simple way by addition of hydrogen when using bis(cyclopentadienyl)chromium (U.S. Pat. No. 3,709,853), bis(indenyl)chromium or bis(fluorenyl)chromium (U.S. Pat. No. 4,015,059) applied to an inorganic, oxidic support.

As in the case of the Ziegler-Natta systems, there is now also a search for catalyst systems having a uniquely defined, active center, known as single site catalysts, in the case of the chromium compounds. The intention is to allow the activity, copolymerization behavior of the catalyst and the properties of the polymers obtained in this way to be altered in a simple fashion by targeted variation of the ligand framework.

DE 197 10615 describes monocyclopentadienylchromium compounds substituted by donor ligands which can be used for the polymerization of both ethene and propene. The donor is in this case from group 15 and uncharged. The donor is bound to the cyclopentadienyl ring via a $(ZR_2)_n$ fragment, where R is hydrogen, alkyl or aryl, Z is an atom of group 14 and n is equal to 1. DE 196 30 580 specifically claims Z=carbon in combination with an amine donor.

WO 96/13529 describes reduced transition metal complexes of elements of groups 4 to 6 of the Periodic Table with polydentate monoanionic ligands. These also include cyclopentadienyl ligands comprising a donor function. The examples are restricted to titanium compounds.

WO 01/12641 describes monocyclopentadienyl complexes of chromium, molybdenum and tungsten which bear, in particular, quinolyl or pyridyl donors which are bound either directly or via a $C_1$ or Si bridge to the cyclopentadienyl system.

WO 01/92346 discloses cyclopentadienyl complexes of elements of groups 4-6 of the Periodic Table of the Elements in which a dihydrocarbyl-Y group, where Y is an element of group 14 of the Periodic Table of the Elements, which bears particular Lewis bases is bound to the cyclopentadienyl system.

In Organometallics 2000, 19, pp. 388-402, Jolly et al. describe a monocyclopentadienylchromium complex which bears an isopropylimine group bound via a $C_1$ bridge to the cyclopentadienyl system.

In Organometallics 2004, 23, 5681-5688, Huang et al. describe monocyclopentadienylchromium complexes in which a pyridine system is bound to the cyclopentadienyl system via a $C_2$ bridge. The activities of these complexes are low and only little comonomer is incorporated.

The abovementioned catalyst systems are not yet optimized in terms of their activities. Furthermore, the polymers and copolymers formed usually have very high molecular weights.

It is an object of the present invention to discover further transition metal complexes based on cyclopentadienyl ligands bearing a bridged donor which are suitable for the polymerization of olefins and display very high activities.

We have accordingly found monocyclopentadienyl complexes comprising the structural feature of the general formula $Cp(-Z-C(R^{1A})=A)_m M^A$ (I), where the variables have the following meanings:

Cp is a cyclopentadienyl system,
Z is a divalent bridge between Cp and the carbon atom which is bound to A and $R^{1A}$, where the shortest link comprises at least 1 atom of group 14 and at least one atom of group 14, 15 or 16 of the Periodic Table of the Elements and is not formed by an aromatic ring,
A is O, S, $NR^{2A}$ or $PR^{2A}$,
$R^{1A}$-$R^{2A}$ are each, independently of one another, hydrogen, $C_1$-$C_{22}$-alkyl, $C_2$-$C_{22}$-alkenyl, $C_6$-$C_{22}$-aryl, arylalkyl having from 1 to 10 carbon atoms in the alkyl radical and 6-20 carbon atoms in the aryl radical, $NR^{3A}{}_2$, $N(SiR^{3A}{}_3)_2$, $OR^{3A}$, $OSiR^{3A}{}_3$, $SiR^{3A}{}_3$, where the organic radicals $R^{1A}$-$R^{2A}$ may also be substituted by halogens and two radicals $R^{1A}$-$R^{2A}$ may also be joined to form a five-, six- or seven-membered, nonaromatic ring,
the radicals $R^{3A}$ are each, independently of one another, hydrogen, $C_1$-$C_{20}$-alkyl, $C_2$-$C_{20}$-alkenyl, $C_6$-$C_{20}$-aryl, arylalkyl having from 1 to 10 carbon atoms in the alkyl radical and 6-20 carbon atoms in the aryl radical and two radicals $R^{3A}$ may also be joined to form a five- or six-membered ring,
$M^A$ is titanium, zirconium, hafnium, vanadium, niobium, tantalum, chromium, molybdenum or tungsten or an element of group 3 of the Periodic Table and the lanthanides and
m is 1, 2 or 3.

Furthermore, we have found a catalyst system comprising the monocyclopentadienyl complexes of the invention, the use of the monocyclopentadienyl complexes or of the catalyst system for the polymerization or copolymerization of olefins and a process for preparing polyolefins by polymerization or copolymerization of olefins in the presence of the monocyclopentadienyl complex or of the catalyst system and polymers obtainable in this way.

The monocyclopentadienyl complexes of the invention comprise the structural element of the general formula $Cp(-Z-C(R^{1A})=A)_m M^A$ (I), where the variables are as defined above. Further ligands can consequently be bound to the metal atom $M^A$. The number of further ligands depends, for example, on the oxidation state of the metal atom. The ligands are not further cyclopentadienyl systems. Suitable ligands are monoanionic and dianionic ligands as described by way of example for X. In addition, Lewis bases such as amines, ethers, ketones, aldehydes, esters, sulfides or phosphines may be bound to the metal center M. The monocyclopentadienyl complexes can be monomeric, dimeric or oligomeric. The monocyclopentadienyl complexes are preferably in monomeric form.

$M^A$ is a metal selected from the group consisting of titanium, zirconium, hafnium, vanadium, niobium, tantalum, chromium, molybdenum and tungsten. The oxidation states of the transition metals $M^A$ in catalytically active complexes are usually known to those skilled in the art. Chromium, molybdenum and tungsten are very probably present in the oxidation state +3, titanium, zirconium, hafnium and vanadium in the oxidation state 4, with titanium and vanadium also being able to be present in the oxidation state 3. However, it is also possible to use complexes whose oxidation state does not correspond to that of the active catalyst. Such complexes can then be appropriately reduced or oxidized by means of suitable activators. $M^4$ is preferably titanium, vanadium, chromium, molybdenum or tungsten. Particular preference is given to chromium in the oxidation states 2, 3 and 4, in particular 3.

m can be 1, 2 or 3, i.e. 1, 2 or 3 groups —Z—$C(R^{1A})$=A can be bound to Cp. If 2 or 3 -Z—$C(R^{1A})$=A groups are present, these can be identical or different. Preference is given to only one group —Z—$C(R^{1A})$=A being bound to Cp (m=1).

The group —$C(R^{1A})$=A is preferably an uncharged functional group, e.g. imine, carboxamide, carboxylic ester, ketone (oxo) or thioketone. A can be bound intermolecularly or intramolecularly to the transition metal $M^4$ or not be bound to it. Preference is given to A being bound intra-molecularly to the metal center $M^4$. Particular preference is given to monocyclopentadienyl complexes comprising the structural element of the general formula

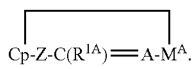

Cp is a cyclopentadienyl system which can bear any substituents and/or be fused with one or more aromatic, aliphatic, heterocyclic or heteroaromatic rings, with 1, 2 or 3 substituents, preferably one substituent, being formed by the group —Z—$C(R^{1A})$=A and/or 1, 2 or 3 substituents, preferably one substituent, being substituted by the group —Z—$C(R^{1A})$=A and/or the aromatic, aliphatic, heterocyclic or heteroaromatic fused ring bearing 1, 2 or 3 substituents, preferably one substituent, —Z—$C(R^{1A})$=A. The cyclopentadienyl skeleton itself is a $C_5$ ring system having $6\pi$ electrons, with one of the carbon atoms also being able to be replaced by nitrogen or phosphorus, preferably phosphorus. Preference is given to using $C_5$ ring systems which do not have a carbon atom replaced by a heteroatom. It is possible, for example, for a heteroaromatic comprising at least one atom from the group consisting of N, P, O and S or an aromatic to be fused to this cyclopentadienyl skeleton. In this context, "fused to" means that the heterocycle and the cyclopentadienyl skeleton share two atoms, preferably carbon atoms. The cyclopentadienyl system is bound to $M^4$.

$R^{1A}$ and $R^{2A}$ and their preferred embodiments are as described for the monocyclopentadienyl complex (II).

Z is a divalent link between Cp and the carbon atom which is bound to A and $R^{1A}$, where the shortest link comprises at least 1 atom of group 14 and at least one atom of group 14, 15 or 16 of the Periodic Table of the Elements and this link is not formed by an aromatic ring system. The link preferably comprises at least two atoms of group 14, in particular at least two carbon atoms. For the present purposes, the shortest link is formed by the atoms which directly connect Cp to the carbon atom which is bound to A and $R^{1A}$ and not further substituents on this bridge. Particularly preferred embodiments of Z in complex (I) are described in more detail for Z in the case of complexes of the formula (II).

Particularly useful monocyclopentadienyl complexes are ones comprising the structural element of the general formula Cp-Z—$C(R^{1A})$=A-$M^4$ (II),

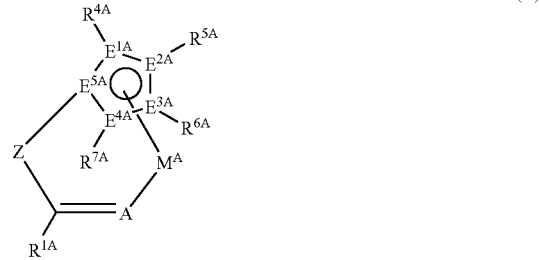

where the variables have the following meanings:

$E^{1A}$-$E^{5A}$ are each carbon or not more than one $E^{1A}$ to $E^{5A}$ is phosphorus, A is O, S, $NR^{2A}$ or $PR^{2A}$, $R^{1A}$-$R^{2A}$ are each, independently of one another, hydrogen, $C_1$-$C_{22}$-alkyl, $C_2$-$C_{22}$-alkenyl, $C_6$-$C_{22}$-aryl, arylalkyl having from 1 to 10 carbon atoms in the alkyl radical and 6-20 carbon atoms in the aryl radical, $NR^{3A}_2$, $N(SiR^{3A}_3)_2$, $OR^{3A}$, $OSiR^{3A}_3$, $SiR^{3A}_3$, where the organic radicals $R^{1A}$-$R^{2A}$ may also be substituted by halogens and two radicals $R^{1A}$-$R^{2A}$ may also be joined to form a five-, six- or seven-membered, nonaromatic ring, the radicals $R^{3A}$ are each, independently of one another, hydrogen, $C_1$-$C_{20}$-alkyl, $C_2$-$C_{20}$-alkenyl, $C_6$-$C_{20}$-aryl, arylalkyl having from 1 to 10 carbon atoms in the alkyl radical and 6-20 carbon atoms in the aryl radical, where the organic radicals $R^{3A}$ may also be substituted by halogens and two radicals $R^{3A}$ may also be joined to form a five- or six-membered ring, $R^{4A}$-$R^{7A}$ are each, independently of one another, hydrogen, $C_1$-$C_{22}$-alkyl, $C_2$-$C_{22}$-alkenyl, $C_6$-$C_{22}$-aryl, arylalkyl having from 1 to 10 carbon atoms in the alkyl radical and 6-20 carbon atoms in the aryl radical, $NR^{8A}_2$, $N(SiR^{8A}_3)_2$, $OR^{8A}$, $OSiR^{8A}_3$, $SiR^{8A}_3$, $BR^{8A}_2$, where the organic radicals $R^{4A}$-$R^{7A}$ may also be substituted by halogens and two vicinal radicals $R^{4A}$-$R^{7A}$ may also be joined to form a five-, six- or seven-membered ring, and/or two vicinal radicals $R^{4A}$-$R^{7A}$ may be joined to form a five-, six- or seven-membered heterocycle comprising at least one atom from the group consisting of N, P, O and S, the radicals $R^{8A}$ are each, independently of one another, hydrogen, $C_1$-$C_{20}$-alkyl, $C_2$-$C_{20}$-alkenyl, $C_6$-$C_{20}$-aryl, arylalkyl having from 1 to 10 carbon atoms in the alkyl radical and 6-20 carbon atoms in the aryl radical, where the organic radicals $R^{8A}$ may also be substituted by halogens and two radicals $R^{8A}$ may also be joined to form a five- or six-membered ring, Z is a divalent bridge between —$C(R^{1A})$=A and Cp and is selected from the group consisting of

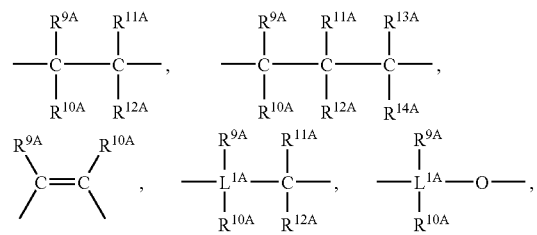

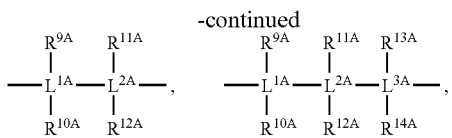

where
$L^{1A}$-$L^{3A}$ are each, independently of one another, silicon or germanium, $R^{9A}$-$R^{14A}$ are each, independently of one another, hydrogen, $C_1$-$C_{20}$-alkyl, $C_2$-$C_{20}$-alkenyl, $C_6$-$C_{20}$-aryl, arylalkyl having from 1 to 10 carbon atoms in the alkyl radical and 6-20 carbon atoms in the aryl radical or $SiR^{15A}_3$, where the organic radicals $R^{9A}$-$R^{14A}$ may also be substituted by halogens and two radicals $R^{9A}$-$R^{14A}$ may also be joined to form a five- or six-membered, nonaromatic ring, and the radicals $R^{15A}$ are each, independently of one another, hydrogen, $C_1$-$C_{20}$-alkyl, $C_2$-$C_{20}$-alkenyl, $C_6$-$C_{20}$-aryl or arylalkyl having from 1 to 10 carbon atoms in the alkyl radical and 6-20 carbon atoms in the aryl radical, $C_1$-$C_{10}$-alkoxy or $C_6$-$C_{10}$-aryloxy and two radicals $R^{15A}$ may also be joined to form a five- or six-membered ring, and $M^A$ is a metal selected from the group consisting of titanium, vanadium, chromium, molybdenum and tungsten.

The ligand Cp-Z—C($R^{1A}$)=A in formula (II) is a preferred embodiment of the ligand Cp-Z—C($R^{1A}$)=A of the formula (I).

In preferred cyclopentadienyl systems Cp, all $E^{1A}$ to $E^{5A}$ are carbon.

Examples of possible carboorganic substituents $R^{1A}$-$R^{2A}$ are: hydrogen, $C_1$-$C_{22}$-alkyl which may be linear or branched, e.g. methyl, ethyl, n-propyl, isopropyl, n-butyl, isobutyl, tert-butyl, n-pentyl, n-hexyl, n-heptyl, n-octyl, n-nonyl, n-decyl or n-dodecyl, 5- to 7-membered cycloalkyl which may in turn bear a $C_1$-$C_{10}$-alkyl group and/or a $C_6$-$C_{10}$-aryl group as substituent, e.g. cyclopropane, cyclo-butane, cyclopentane, cyclohexane, cycloheptane, cyclooctane, cyclononane or cyclododecane, $C_2$-$C_{22}$-alkenyl which may be linear, cyclic or branched and in which the double bond can be internal or terminal, e.g. vinyl, 1-allyl, 2-allyl, 3-allyl, butenyl, pentenyl, hexenyl, cyclopentenyl, cyclohexenyl, cyclooctenyl or cyclooctadienyl, $C_6$-$C_{22}$-aryl which may be substituted by further alkyl group/s, e.g. phenyl, naphthyl, biphenyl, anthranyl, o-, m-, p-methylphenyl, 2,3-, 2,4-, 2,5-, or 2,6-dimethylphenyl, 2,3,4-, 2,3,5-, 2,3,6-, 2,4,5-, 2,4,6- or 3,4,5-trimethylphenyl, and arylalkyl which may be substituted by further alkyl groups, e.g. benzyl, o-, m-, p-methylbenzyl, 1- or 2-ethylphenyl, where two of the radicals $R^{1A}$ to $R^{2A}$ may also be joined to form a 5-, 6- or 7-membered, nonaromatic ring which is a heterocycle and/or the organic radicals $R^{1A}$-$R^2$ may also be substituted by halogens such as fluorine, chlorine or bromine. Furthermore, $R^{1A}$-$R^{2A}$ can also be amino $NR^{3A}_2$, or $N(SiR^{3A}_3)_2$, alkoxy or aryloxy $OR^{3A}$, for example dimethylamino, N-pyrrolidinyl, picolinyl, methoxy, ethoxy or isopropoxy. In organosilicon substituents $SiR^{3A}_3$, the radicals $R^{3A}$ can be the same carboorganic radicals as described in more detail above for $R^{4A}$-$R^{7A}$, where the organic radicals $R^{3A}$ may also be substituted by halogens such as fluorine, chlorine or bromine and/or two $R^{3A}$ may also be joined to form a 5- or 6-membered ring, e.g. trimethylsilyl, triethylsilyl, butyldimethylsilyl, tributylsilyl, tri-tert-butylsilyl, triallylsilyl, triphenylsilyl or dimethylphenylsilyl. These $SiR^{3A}_3$ radicals can also be bound to the cyclopentadienyl skeleton via an oxygen or nitrogen, for example trimethylsilyloxy, triethylsilyloxy, butyldimethylsilyloxy, tributylsilyloxy or tri-tert-butylsilyloxy. Preferred radicals $R^{1A}$-$R^{2A}$ are carboorganic substituents, in particular hydrogen, methyl, ethyl, n-propyl, isopropyl, n-butyl, isobutyl, tert-butyl, n-pentyl, n-hexyl, n-heptyl, n-octyl, vinyl, allyl, benzyl, phenyl, ortho-dialkyl- or -dichloro-substituted phenyls, trialkyl- or trichloro-substituted phenyls, naphthyl, biphenyl and anthranyl.

Examples of possible carboorganic substituents $R^{4A}$-$R^{7A}$ are: hydrogen, $C_1$-$C_{22}$-alkyl which may be linear or branched, e.g. methyl, ethyl, n-propyl, isopropyl, n-butyl, isobutyl, tert-butyl, n-pentyl, n-hexyl, n-heptyl, n-octyl, n-nonyl, n-decyl or n-dodecyl, 5- to 7-membered cycloalkyl which may in turn bear a $C_1$-$C_{10}$-alkyl group and/or a $C_6$-$C_{10}$-aryl group as substituent, e.g. cyclopropane, cyclo-butane, cyclopentane, cyclohexane, cycloheptane, cyclooctane, cyclononane or cyclododecane, $C_2$-$C_{22}$-alkenyl which may be linear, cyclic or branched and in which the double bond can be internal or terminal, e.g. vinyl, 1-allyl, 2-allyl, 3-allyl, butenyl, pentenyl, hexenyl, cyclopentenyl, cyclohexenyl, cyclooctenyl or cyclooctadienyl, $C_6$-$C_{22}$-aryl which may be substituted by further alkyl group/s, e.g. phenyl, naphthyl, biphenyl, anthranyl, o-, m-, p-methylphenyl, 2,3-, 2,4-, 2,5-, or 2,6-dimethylphenyl, 2,3,4-, 2,3,5-, 2,3,6-, 2,4,5-, 2,4,6- or 3,4,5-trimethylphenyl, and arylalkyl which may be substituted by further alkyl groups, e.g. benzyl, o-, m-, p-methylbenzyl, 1- or 2-ethylphenyl, where two of the radicals $R^{4A}$ to $R^{7A}$ may also be joined to form a 5-, 6- or 7-membered ring and/or two of the vicinal radicals $R^{4A}$-$R^{7A}$ may be joined to form a five-, six- or seven-membered heterocycle comprising at least one atom from the group consisting of N, P, O and S and/or the organic radicals $R^{4A}$-$R^{7A}$ may also be substituted by halogens such as fluorine, chlorine or bromine. Furthermore, $R^{4A}$-$R^{7A}$ can also be amino $NR^{8A}_2$, or $N(SiR^{8A}_3)_2$, alkoxy or aryloxy $OR^{8A}$, for example dimethylamino, N-pyrrolidinyl, picolinyl, methoxy, ethoxy or isopropoxy. In organosilicon substituents $SiR^{8A}_3$, the radicals $R^{8A}$ can be the same carboorganic radicals as described in more detail above for $R^{4A}$-$R^{7A}$, where the organic radicals $R^{8A}$ may also be substituted by halogens such as fluorine, chlorine or bromine and/or two $R^{8A}$ may also be joined to form a 5- or 6-membered ring, e.g. trimethylsilyl, triethylsilyl, butyldimethylsilyl, tributylsilyl, tri-tert-butylsilyl, triallylsilyl, triphenylsilyl or dimethylphenylsilyl. These $SiR^{8A}_3$ radicals can also be bound to the cyclopentadienyl skeleton via an oxygen or nitrogen, for example trimethylsilyloxy, triethylsilyloxy, butyldimethylsilyloxy, tributylsilyloxy or tri-tert-butylsilyloxy. Preferred radicals $R^{4A}$-$R^{7A}$ are hydrogen, methyl, ethyl, n-propyl, isopropyl, n-butyl, isobutyl, tert-butyl, n-pentyl, n-hexyl, n-heptyl, n-octyl, vinyl, allyl, benzyl, phenyl, ortho-dialkyl- or -dichloro-substituted phenyls, trialkyl- or trichloro-substituted phenyls, naphthyl, biphenyl and anthranyl. Particularly useful organosilicon substituents are trialkylsilyl groups having from 1 to 10 carbon atoms in the alkyl radical, in particular trimethylsilyl groups.

Two vicinal radicals $R^{4A}$-$R^{7A}$ together with the atoms $E^{1A}$-$E^{5A}$ bearing them may form a heterocycle, preferably a heteroaromatic, which contains at least one atom from the group consisting of nitrogen, phosphorus, oxygen and sulfur, particularly preferably nitrogen and/or sulfur, with preference being given to the atoms $E^{1A}$-$E^{5A}$ present in the heterocycle or heteroaromatic being carbon. Preference is given to heterocycles and heteroaromatics having a ring size of 5 or 6 ring atoms. Examples of 5-membered heterocycles which may comprise from one to four nitrogen atoms and/or a sulfur or oxygen atom in addition to carbon atoms as ring members are 1,2-dihydrofuran, furan, thiophene, pyrrole, isoxazole, 3-isothiazole, pyrazole, oxazole, thiazole, imidazole, 1,2,4- oxadiazole, 1,2,5-oxadiazole, 1,3,4-oxadiazole, 1,2,3-triazole and 1,2,4-triazole. Examples of 6-membered heteroaryl groups which may comprise from one to four nitrogen atoms and/or a phosphorus atom are pyridine, phosphobenzene, pyridazine, pyrimidine, pyrazine, 1,3,5-triazine, 1,2,4-triazine or 1,2,3-triazine. The 5-membered and 6-membered heterocycles can also be substituted by $C_1$-$C_{10}$-alkyl, $C_6$-$C_{11}$-aryl, alkylaryl having from 1 to 10 carbon atoms in the alkyl radical and 6-10 carbon atoms in the aryl radical, trialkylsilyl or halogens such as fluorine, chlorine or bromine, dialkylamide, alkylarylamide, diarylamide, alkoxy or aryloxy or be fused with one or more aromatics or heteroaromatics. Examples of benzo-fused 5-membered heteroaryl groups are indole, indazole, benzofuran, benzothiophene, benzothiazole, benzoxazole and benzimidazole. Examples of benzo-fused 6-membered heteroaryl groups are chromane, benzopyran, quinoline, isoquinoline, cinnoline, phthalazine, quinazoline, quinoxaline, 1,10-phenanthroline and quinolizine. Naming and numbering of the heterocycles has been taken from Lettau, Chemie der Heterocyclen, 1$^{st}$ edition, VEB, Leipzig 1980 pp. 16-29. The heterocycles/heteroaromatics are preferably fused with the cyclopentadienyl skeleton via a C—C double bond of the heterocycle/heteroaromatic. Heterocycles/heteroaromatics having one heteroatom are preferably 2,3- or b-fused.

Cyclopentadienyl systems Cp having a fused heterocycle are, for example, thiapentalene, methylthiapentalene, ethylthiapentalene, isopropylthiapentalene, n-butylthiapentalene, tert-butyl-thiapentalene, trimethylsilylthiapentalene, phenylthiapentalene, naphthylthiapentalene, methylthiopentalene, azapentalene, methylazapentalene, ethylazapentalene, isopropylazapentalene, n-butylazapentalene, trimethylsilylazapentalene, phenylazapentalene, naphthylazapentalene, oxapentalene or phosphapentalene.

The synthesis of such cyclopentadienyl systems having a fused-on heterocycle is described, for example, in the above-mentioned WO 98/22486. In "metalorganic catalysts for synthesis and polymerisation", Springer Verlag 1999, Ewen et al., p. 150 ff, describe further syntheses of these cyclopentadienyl systems.

Particularly preferred substituents $R^{4A}$-$R^{7A}$ are the above-described carboorganic substituents and the carboorganic substituents which form a cyclic fused ring system, i.e. together with the $E^{1A}$-$E^{5A}$ skeleton, preferably together with a $C_5$-cyclopentadienyl skeleton, form, for example, an unsubstituted or substituted indenyl, benzindenyl, phenanthrenyl or tetrahydroindenyl system, and in particular their preferred embodiments.

Examples of such cyclopentadienyl systems (without the group —Z—C($R^{1A}$)=A-, which is preferably located in the 1 position) are monoalkylcyclopentadienyl systems, e.g. 3-methylcyclopentadienyl, 3-ethylcyclopentadienyl, 3-isopropylcyclopentadienyl, 3-tert-butylcyclopentadienyl, dialkylcyclopentadienyl systems, e.g. tetrahydroindenyl, 2,4-dimethylcyclopentadienyl or 3-methyl-5-tert-butylcyclopentadienyl, trialkylcyclopentadienyl systems, e.g. 2,3,5-trimethyl-cyclopentadienyl, or tetraalkylcyclopentadienyl systems, e.g. 2,3,4,5-tetramethylcyclopentadienyl and also indenyl or benzindenyl. The group —Z—C($R^{1A}$)=A- is also located in the 1 position in the indenyl and benzindenyl systems. The fused ring system may bear further $C_1$-$C_{20}$-alkyl, $C_2$-$C_{20}$-alkenyl, $C_6$-$C_{20}$-aryl, alkylaryl having from 1 to 10 carbon atoms in the alkyl radical and 6-20 carbon atoms in the aryl radical, $NR^{8A}_2$, $N(SiR^{8A}_3)_2$, $OR^{8A}$, $OSiR^{8A}_3$ or $SiR^{8A}_3$, e.g. 4-methylindenyl, 4-ethylindenyl, 4-isopropylindenyl, 5-methylindenyl, 4-phenylindenyl, 5-methyl-4-phenylindenyl or 4-naphthylindenyl.

As in the cases of the metallocenes, the monocyclopentadienyl complexes of the invention can be chiral. Thus, either one of the substituents $R^{4A}$-$R^{7A}$ on the cyclopentadienyl skeleton can bear one or more chiral centers or else the cyclopentadienyl system Cp can itself be enantiotopic, so that the chirality is induced only when it is bound to the transition metal $M^A$ (for the conventions regarding chirality in cyclopentadienyl compounds, see R. Halterman, Chem. Rev. 92, (1992), 965-994).

The bridge Z between the cyclopentadienyl system Cp and the group —C($R^{1A}$)=A- is an organic divalent bridge, preferably consisting of carbon- and/or silicon-comprising bridge members. Changing the length of the link between the cyclopentadienyl system and the group —C($R^{1A}$)=A- enables the activity of the catalyst to be influenced.

Possible carboorganic substituents $R^{9A}$-$R^{14A}$ on the link Z are, for example, the following: hydrogen, $C_1$-$C_{20}$-alkyl which may be linear or branched, e.g. methyl, ethyl, n-propyl, isopropyl, n-butyl, isobutyl, tert-butyl, n-pentyl, n-hexyl, n-heptyl, n-octyl, n-nonyl, n-decyl or n-dodecyl, 5- to 7-membered cycloalkyl which may in turn bear a $C_6$-$C_{10}$-aryl group as substituent, e.g. cyclopropane, cyclobutane, cyclopentane, cyclohexane, cycloheptane, cyclooctane, cyclononane or cyclododecane, $C_2$-$C_{20}$-alkenyl which may be linear, cyclic or branched and in which the double bond can be internal or terminal, e.g. vinyl, 1-allyl, 2-allyl, 3-allyl, butenyl, pentenyl, hexenyl, cyclopentenyl, cyclohexenyl, cyclooctenyl or cyclooctadienyl, $C_6$-$C_{20}$-aryl which may be substituted by further alkyl groups, e.g. phenyl, naphthyl, biphenyl, anthranyl, o-, m-, p-methyl-phenyl, 2,3-, 2,4-, 2,5-, or 2,6-dimethylphen-1-yl, 2,3,4-, 2,3,5-, 2,3,6-, 2,4,5-, 2,4,6- or 3,4,5-tri-methylphen-1-yl, or arylalkyl which may be substituted by further alkyl groups, e.g. benzyl, o-, m-, p-methylbenzyl, 1- or 2-ethylphenyl, where two radicals $R^{9A}$ to $R^{14A}$ may also be joined to form a 5- or 6-membered, nonaromatic ring, for example cyclohexane, and the organic radicals $R^{9A}$-$R^{14A}$ may also be substituted by halogens, such as fluorine, chlorine or bromine, for example pentafluorophenyl or bis-3,5-trifluoromethylphen-1-yl, and alkyl or aryl.

In organosilicon substituents $SiR^{15A}_3$, possible radicals $R^{15A}$ are the same radicals mentioned in more detail above for $R^{9A}$-$R^{14A}$, where two radicals $R^{15A}$ may also be joined to form a 5- or 6-membered ring, e.g. trimethylsilyl, triethylsilyl, butyldimethylsilyl, tributylsilyl, tri-tert-butylsilyl, triallylsilyl, triphenylsilyl or dimethylphenylsilyl. Preferred radicals $R^{15A}$ are methyl, ethyl, n-propyl, isopropyl, n-butyl, isobutyl, tert-butyl, n-pentyl, n-hexyl, n-heptyl, n-octyl, benzyl, phenyl, ortho-dialkyl- or -dichloro-substituted phenyls, trialkyl- or trichloro-substituted phenyls, naphthyl, biphenyl and anthranyl.

Particularly preferred substituents $R^{9A}$ to $R^{14A}$ are hydrogen, methyl, ethyl, 1-propyl, 2-isopropyl, 1-butyl, 2-tert-butyl, benzyl and phenyl.

Z is preferably a —$CR^{9A}R^{10A}CR^{11A}R^{12A}$—, —$SiR^{9A}R^{10A}CR^{11A}R^{12A}$— group, with Si preferably being bound to Cp, and in particular —$CR^{9A}R^{10A}CR^{11A}R^{12A}$—. Here, the preferred embodiments of the substituents $R^{9A}$ to $R^{14A}$ described above are likewise preferred embodiments. —$CR^{9A}R^{10A}CR^{11A}R^{12A}$— is preferably a —$CR^{9A}R^{11A}$—$CH_2$— group, with $CR^{9A}C^{10A}$ preferably being bound to Cp, in particular —$C(CH_3)_2$—$CH_2$—, with $C(CH_3)_2$ preferably being bound to Cp.

A is an uncharged O, S, $NR^{2A}$ or $PR^{2A}$ group, preferably O or $NR^{2A}$ and in particular $NR^{2A}$. The donor function (the free electron pair) in A can bind intermolecularly or intramolecularly to the metal $M^A$. The donor in A is preferably bound intramolecularly to $M^A$. Suitable groups —C($R^{1A}$)=A- are, for example, imine, carboxamide, carboxylic ester, ketone (oxo), aldehyde or thioketone. A is preferably O or $NR^{2A}$, in particular $NR^{2A}$.

In the imino group —C=$NR^{1A}$, $R^{1A}$ is preferably a $C_6$-$C_{20}$-aryl radical which may be substituted by further alkyl groups, e.g. phenyl, naphthyl, biphenyl, anthranyl, o-, m-, p-methylphenyl, 2,3-, 2,4-, 2,5-, or 2,6-dimethylphen-1-yl, 2,3,4-, 2,3,5-, 2,3,6-, 2,4,5-, 2,4,6- or 3,4,5-trimethylphen-1-yl. In a further preferred embodiment, $R^{1A}$ in the imino group —C=$NR^{1A}$ is a substituent $NR^{3A}{}_2$. The substituent $NR^{3A}{}_2$ is preferably a secondary amide such as dimethylamide, N-ethylmethylamide, diethylamide, N-methylpropylamide, N-methylisopropylamide, N-ethylisopropylamide, dipropylamide, diisopropylamide, N-methylbutylamide, N-ethylbutylamide, N-methyl-tert-butyl-amide, N-tert-butylisopropylamide, dibutylamide, di-sec-butylamide, diisobutylamide, tert-amyl-tert-butylamide, dipentylamide, N-methylhexylamide, dihexylamide, tert-amyl-tert-octylamide, dioctylamide, bis(2-ethylhexyl)amide, didecylamide, N-methyloctadecylamide, N-methylcyclo-hexylamide, N-ethylcyclohexylamide, N-isopropylcyclohexylamide, N-tert-butylcyclohexylamide, dicyclohexylamide, substituted and unsubstituted pyrrolidine, piperidine, hexamethyleneimine, decahydroquinoline, diphenylamine, N-methylanilide or N-ethylanilide.

Preference is likewise given to A being a group of the formula (III)

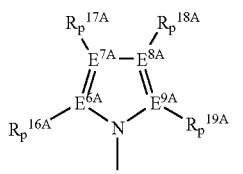

(III)

where $E^{6A}$-$E^{9A}$ are each, independently of one another, carbon or nitrogen, $R^{16A}$-$R^{19A}$ are each, independently of one another, hydrogen, $C_1$-$C_{22}$-alkyl, $C_2$-$C_{22}$-alkenyl, $C_6$-$C_{22}$-aryl, arylalkyl having from 1 to 10 carbon atoms in the alkyl radical and 6-20 carbon atoms in the aryl radical, $NR^{20A}{}_2$, $N(SiR^{20A}{}_3)_2$, $OR^{20A}$, $OSiR^{20A}{}_3$, $SR^{20A}$, $SiR^{20A}{}_3$, where the organic radicals $R^{16A}$-$R^{19A}$ may also be substituted by halogens and two vicinal radicals $R^{16A}$-$R^{19A}$ may also be joined to form a five-, six- or seven-membered ring, and/or two vicinal radicals $R^{16A}$-$R^{19A}$ are joined to form a five-, six- or seven-membered heterocycle comprising at least one atom from the group consisting of N, P, O and S, the radicals $R^{20A}$ are each, independently of one another, hydrogen, $C_1$-$C_{20}$-alkyl, $C_2$-$C_{20}$-alkenyl, $C_6$-$C_{20}$-aryl, arylalkyl having from 1 to 10 carbon atoms in the alkyl radical and 6-20 carbon atoms in the aryl radical, where the organic radicals $R^{20A}$ may also be substituted by halogens and two radicals $R^{20A}$ may also be joined to form a five- or six-membered ring, p is 0 when $E^{6A}$-$E^{9A}$ is nitrogen and is 1 when $E^{6A}$-$E^{9A}$ is carbon.

A is, for example, 1-pyrrolyl, 1-indolyl, 1-pyrazolyl, 1-imidazolyl, 1-(2-methylimidazolyl), 1-(2-butyl-imidazolyl), 1-(2-benzylimidazolyl), 1-(2-phenylimidazolyl) or 1-benzimidazolyl, 1-(1,2,3-triazolyl), 1-(1,2,4)-triazolyl, 2-(1,2,3-triazolyl), 1-benzotriazolyl or 1-tetrazolyl. Preference is given to 0 or 1 of $E^{6A}$-$E^{9A}$ being nitrogen and the remainder being carbon. Particular preference is given to $E^{7A}$ or $E^{8A}$ being nitrogen.

The synthesis to join A to the cyclopentadienyl radical and Z—C($R^{1A}$) can, for example, be carried out by a method analogous to that of WO 04/020479.

$M^A$ is a metal selected from the group consisting of titanium, in particular titanium in oxidation state 3, vanadium, chromium, molybdenum and tungsten, preferably titanium in the oxidation state 3 and chromium. Particular preference is given to chromium in the oxidation states 2, 3 and 4, in particular 3. The metal complexes, in particular the chromium complexes, can be obtained in a simple manner by reacting the corresponding metal salts, e.g. metal chlorides, with the ligand anion (e.g. using a method analogous to the examples in DE 197 10615).

Particular preference is given to monocyclopentadienyl complexes comprising the structural element of the general formula Cp-Z—C($R^{1A}$)=A-$M^A$ (IV) in which Z is $CR^{9A}R^{10A}$—$CR^{11A}R^{12A}$

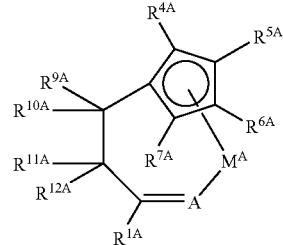

(IV)

where the variables have the following meanings:

A is $NR^{2A}$, $R^{1A}$-$R^{2A}$ are each, independently of one another, hydrogen, $C_1$-$C_{22}$-alkyl, $C_2$-$C_{22}$-alkenyl, $C_6$-$C_{22}$-aryl, arylalkyl having from 1 to 10 carbon atoms in the alkyl radical and 6-20 carbon atoms in the aryl radical, $NR^{3A}{}_2$, $N(SiR^{3A}{}_3)_2$, $OR^{3A}$, $OSiR^{3A}{}_3$, $SiR^{3A}{}_3$, where the organic radicals $R^{1A}$-$R^{2A}$ may also be substituted by halogens and two radicals $R^{1A}$-$R^{2A}$ may also be joined to form a five-, six- or seven-membered, nonaromatic ring, the radicals $R^{3A}$ are each, independently of one another, hydrogen, $C_1$-$C_{20}$-alkyl, $C_2$-$C_{20}$-alkenyl, $C_6$-$C_{20}$-aryl, arylalkyl having from 1 to 10 carbon atoms in the alkyl radical and 6-20 carbon atoms in the aryl radical, where the organic radicals $R^{3A}$ may also be substituted by halogens and two radicals $R^{3A}$ may also be joined to form a five- or six-membered ring, $R^{4A}$-$R^{7A}$ are each, independently of one another, hydrogen, $C_1$-$C_{22}$-alkyl, $C_2$-$C_{22}$-alkenyl, $C_6$-$C_{22}$-aryl, arylalkyl having from 1 to 10 carbon atoms in the alkyl radical and 6-20 carbon atoms in the aryl radical, $NR^{8A}{}_2$, $N(SiR^{8A}{}_3)_2$, $OR^{8A}$, $OSiR^{8A}{}_3$, $SiR^{8A}{}_3$, $BR^{8A}{}_2$ where the organic radicals $R^{4A}$-$R^{7A}$ may also be substituted by halogens and two vicinal radicals $R^{4A}$-$R^{7A}$ may also be joined to form a five-, six- or seven-membered ring, and/or two radicals $R^{4A}$-$R^{7A}$ are joined to form a five-, six- or seven-membered heterocycle comprising at least one atom from the group consisting of N, P, O and S, the radicals $R^{8A}$ are each, independently of one another, hydrogen, $C_1$-$C_{20}$-alkyl, $C_2$-$C_{20}$-alkenyl, $C_6$-$C_{20}$-aryl, arylalkyl having from 1 to 10 carbon atoms in the alkyl radical and 6-20 carbon atoms in the aryl radical, where the organic radicals $R^{8A}$ may also be substituted by halogen and two radicals $R^{8A}$ may also be joined to form a five- or six-membered ring, $R^{9A}$-$R^{12A}$ are each, independently of one another, hydrogen, $C_1$-$C_{20}$-alkyl, $C_2$-$C_{20}$-alkenyl, $C_6$-$C_{20}$-aryl, arylalkyl having from 1 to 10 carbon atoms in the alkyl radical and 6-20 carbon atoms in the aryl radical or $SiR^{15A}{}_3$, where the organic radicals $R^{9A}$-$R^{12A}$ may also be substituted by halogens and two radicals $R^{9A}$-$R^{12A}$ may also be joined to form a five- or six-membered, nonaromatic ring, and the radicals $R^{15A}$ are each, independently of one another, hydrogen, $C_1$-$C_{20}$-alkyl, $C_2$-$C_{20}$-alkenyl, $C_6$-$C_{20}$-aryl or arylalkyl having from 1 to 10 carbon atoms in the alkyl radical and 6-20 carbon atoms in the aryl radical, $C_1$-$C_{10}$-alkoxy or $C_6$-$C_{10}$-aryloxy and two radicals $R^{15A}$ may also be joined to form a five- or six-membered ring, and $M^A$ is a metal selected from the group consisting of titanium in the oxidation state 3, vanadium, chromium, molybdenum and tungsten.

The above-described preferred embodiments of the variables are also preferred in this preferred combination.

Among the suitable monocyclopentadienyl complexes, preference is given to those of the general formula Cp-Z—C($R^{1A}$)=A-$M^A X^A{}_n$(V), where the variables Cp, Z, $R^{1A}$, A and $M^A$ are as defined above and their preferred embodiments are also preferred here and:

the radicals $X^A$ are each, independently of one another, fluorine, chlorine, bromine, iodine, hydrogen, $C_1$-$C_{10}$-alkyl, $C_2$-$C_{10}$-alkenyl, $C_6$-$C_{20}$-aryl, arylalkyl having 1-10 carbon atoms in the alkyl radical and 6-20 carbon atoms in the aryl radical, $NR^{21A}R^{22A}$, $OR^{21A}$, $SR^{21A}$, $SO_3R^{21A}$, $OC(O)R^{21A}$, CN, SCN, β-diketonate, CO, $BF_4^-$, $PF_6^-$ or bulky noncoordinating anions or two radicals $X^A$ form a substituted or unsubstituted diene ligand, in particular a 1,3-diene ligand, and the radicals $X^A$ may be joined to one another and/or be substituted by halogens, $R^{21A}$-$R^{22A}$ are each, independently of one another, hydrogen, $C_1$-$C_{20}$-alkyl, $C_2$-$C_{20}$-alkenyl, $C_6$-$C_{20}$-aryl, arylalkyl having from 1 to 10 carbon atoms in the alkyl radical and 6-20 carbon atoms in the aryl radical, $SiR^{23A}{}_3$, where the organic radicals $R^{21A}$-$R^{22A}$ may also be substituted by halogens or nitrogen- and oxygen-comprising groups and two radicals $R^{21A}$-$R^{22A}$ may also be joined to form a five- or six-membered ring, the radicals $R^{23A}$ are each, independently of one another, hydrogen, $C_1$-$C_{20}$-alkyl, $C_2$-$C_{20}$-alkenyl, $C_6$-$C_{20}$-aryl, arylalkyl having from 1 to 10 carbon atoms in the alkyl radical and 6-20 carbon atoms in the aryl radical and two radicals $R^{23A}$ may also be joined to form a five- or six-membered ring and n is 1, 2, or 3.

The above-described embodiments and preferred embodiments of Cp, Z, $R^{1A}$, A and $M^A$ in the formulae (I), (II) or (IV) also apply individually and in combination to these preferred monocyclo-pentadienyl complexes (V).

The ligands $X^A$ result from, for example, the choice of the metal compounds used as starting materials for the synthesis of the monocyclopentadienyl complexes, but can also be varied subsequently. Possible ligands $X^A$ are, in particular, the halogens such as fluorine, chlorine, bromine or iodine, in particular chlorine. Alkyl radicals such as methyl, ethyl, propyl, butyl, vinyl, allyl, phenyl or benzyl are also advantageous ligands $X^A$. As further ligands $X^A$, mention may be made, purely by way of example and in no way exhaustively, of trifluoroacetate, $BF_4^-$, $PF_6^-$ and weakly coordinating or non-coordinating anions (cf., for example, S. Strauss in Chem. Rev. 1993, 93, 927-942) such as $B(C_6F_5)_4^-$.

Amides, alkoxides, sulfonates, carboxylates and β-diketonates are also particularly suitable ligands $X^A$. Variation of the radicals $R^{21A}$ and $R^{22A}$ makes it possible, for example, to make fine adjustments to physical properties such as solubility. Possible carboorganic substituents $R^{231}$-$R^{22A}$ are, for example, the following: $C_1$-$C_{20}$-alkyl which may be linear or branched, e.g. methyl, ethyl, n-propyl, isopropyl, n-butyl, isobutyl, tert-butyl, n-pentyl, n-hexyl, n-heptyl, n-octyl, n-nonyl, n-decyl or n-dodecyl, 5- to 7-membered cycloalkyl which may in turn bear a $C_6$-$C_{10}$-aryl group as substituent, e.g. cyclopropane, cyclobutane, cyclopentane, cyclohexane, cycloheptane, cyclooctane, cyclononane or cyclododecane, $C_2$-$C_{20}$-alkenyl which may be linear, cyclic or branched and in which the double bond may be internal or terminal, e.g. vinyl, 1-allyl, 2-allyl, 3-allyl, butenyl, pentenyl, hexenyl, cyclopentenyl, cyclohexenyl, cyclooctenyl or cyclooctadienyl, $C_6$-$C_{20}$-aryl which may be substituted by further alkyl groups and/or N- or O-comprising radicals, e.g. phenyl, naphthyl, biphenyl, anthranyl, o-, m-, p-methylphenyl, 2,3-, 2,4-, 2,5- or 2,6-dimethyl-phenyl, 2,3,4-, 2,3,5-, 2,3,6-, 2,4,5-, 2,4, 6- or 3,4,5-trimethylphenyl, 2-methoxyphenyl, 2-N,N-dimethylaminophenyl, or arylalkyl which may be substituted by further alkyl groups, e.g. benzyl, o-, m-, p-methylbenzyl, 1- or 2-ethylphenyl, where $R^{23A}$ may also be joined to $R^{24A}$ to form a 5- or 6-membered ring and the organic radicals $R^{21A}$-$R^{22A}$ may also be substituted by halogens such as fluorine, chlorine or bromine. In organosilicon substituents $SiR^{23A}{}_3$, the radicals $R^{23A}$ can be the same radicals described in more detail above for $R^{21A}$-$R^{22A}$, where two radicals $R^{23A}$ may also be joined to form a 5- or 6-membered ring, e.g. trimethylsilyl, triethylsilyl, butyldimethylsilyl, tributyl-silyl, triallylsilyl, triphenylsilyl or dimethylphenylsilyl. Preference is given to using $C_1$-$C_{10}$-alkyl such as methyl, ethyl, n-propyl, n-butyl, tert-butyl, n-pentyl, n-hexyl, n-heptyl, n-octyl and also vinyl, allyl, benzyl and phenyl as radicals $R^{21A}$ and $R^{22A}$. Some of these substituted ligands $X^A$ are particularly preferably used because they are obtainable from cheap and readily available starting materials. Thus, a particularly preferred embodiment is that in which $X^A$ is dimethylamide, methoxide, ethoxide, isopropoxide, phenoxide, naphthoxide, triflate, p-toluenesulfonate, acetate or acetylacetonate.

The number n of the ligands $X^A$ depends on the oxidation state of the transition metal $M^A$. The number n can therefore not be given in general terms. The oxidation state of the transition metals $M^A$ in catalytically active complexes is usually known to those skilled in the art. Chromium, molybdenum and tungsten are very probably present in the oxidation state +3, vanadium in the oxidation state +3 or +4. However, it is also possible to use complexes whose oxidation state does not correspond to that of the active catalyst. Such complexes can then be appropriately reduced or oxidized by means of suitable activators. Preference is given to using chromium complexes in the oxidation state +3 and titanium complexes in the oxidation state 3.

Preferred monocyclopentadienyl complexes A) of this type are dichloro(3-cyclopentadienyl-3-methyl-1-phenylbutyl-idene-2,6-dimethylphenylamino)chromium(III), dichloro(3-1-(3-benzylcyclopentadienyl)-3-methyl-1-phenylbutyl-idene-2,6-dimethylphenylamino)chromium(III), dichloro(3-(1-(3-(4-chlorobenzyl)cyclopentadienyl)-3-methyl-1-phenylbutylidene-2,6-dimethylphenylamino)-chromium (III), dichloro(3-(1-indenyl)-3-methyl-1-phenylbutylidene-2,6-dimethylphenylamino)-chromium(III), dichloro(3-cyclopentadienyl-3-methyl-1-phenylbutylidene-2,6-dimethylphenyl-amino)chromium(III), dichloro(3-cyclopentadienyl-3-methyl-1-phenylbutylideneisopropylamino)-chromium(III), dichloro (3-cyclopentadienyl-3-methyl-1-phenylbutylidene-tert-butylamino)-chromium(III), dichloro(3-cyclopentadienyl-3-methyl-1-phenylbutylidenediisopropylhydrazino)-chromium(III), dichloro(3-cyclopentadienyl-3-methyl-1-methylbutylideneisopropylamino)-chromium(III) and dichloro(3-cyclopentadienyl-3-methyl-1-phenylbutylidene (2-5dimethylpyrrol-1-yl)amino)chromium(III).

The synthesis of such complexes can be carried out by methods known per se, with preference being given to reacting the appropriately substituted cyclopentadienyl anions with halides of titanium, vanadium or chromium. Examples of such preparative methods are described, inter alia, in the Journal of Organometallic Chemistry, 369 (1989), 359-370, and in EP-A-1212333.

The monocyclopentadienyl complexes of the invention can be used alone or together with further components as catalyst system for olefin polymerization. We have also found catalyst systems for olefin polymerization comprising A) at least one monocyclopentadienyl complex according to the invention
B) optionally an organic or inorganic support,
C) optionally one or more activating compounds,
D) optionally one or more catalysts suitable for olefin polymerization and
E) optionally one or more metal compounds comprising a metal of group 1, 2 or 13 of the Periodic Table.

Thus, more than one of the monocyclopentadienyl complexes of the invention can simultaneously be brought into contact with the olefin or olefins to be polymerized. This has the advantage that a wide range of polymers can be produced in this way. For example, bimodal products can be prepared in this way.

For the monocyclopentadienyl complexes of the invention to be able to be used in polymerization processes in the gas phase or in suspension, it is often advantageous for them to be used in the form of a solid, i.e. for them to be applied to a solid support B). Furthermore, the supported monocyclopentadienyl complexes have a high productivity. Consequently, the monocyclopentadienyl complexes of the invention can, if desired, also be immobilized on an organic or inorganic support B) and be used in supported form in the polymerization. This enables, for example, deposits in the reactor to be avoided and the polymer morphology to be controlled. As support materials, preference is given to using silica gel, magnesium chloride, aluminum oxide, mesoporus materials, aluminosilicates, hydrotalcites and organic polymers such as polyethylene, polypropylene, polystyrene, polytetrafluoroethylene or polymers bearing polar functional groups, for example copolymers of ethene and acrylic esters, acrolein or vinyl acetate.

Particular preference is given to a catalyst system comprising a monocyclopentadienyl complex according to the invention and at least one activating compound C) together with a support component B).

To obtain such a supported catalyst system, the unsupported catalyst system can be reacted with a support component B). The order in which support component B), monocyclopentadienyl complex A) according to the invention and the activating compound C) are added is in principle immaterial. The monocyclopentadienyl complex A) of the invention and the activating compound C) can be immobilized independently of one another or simultaneously. After the individual process steps, the solid can be washed with suitable inert solvents, e.g. aliphatic or aromatic hydrocarbons.

In a preferred method of preparing the supported catalyst system, at least one of the monocyclopentadienyl complexes of the invention is brought into contact with at least one activating compound C) in a suitable solvent, preferably giving a soluble reaction product, an adduct or a mixture. The preparation obtained in this way is then mixed with the dehydrated or passivated support material, the solvent is removed and the resulting supported monocyclopentadienyl complex catalyst system is dried to ensure that all or most of the solvent is removed from the pores of the support material. The supported catalyst is obtained as a free-flowing powder. Examples of the industrial implementation of the above process are described in WO 96/00243, WO 98/40419 or WO 00/05277. In a further preferred embodiment, the activating compound C) is applied to the support component B) first and this supported compound is subsequently brought into contact with the monocyclopentadienyl complex A) of the invention.

As support component B), preference is given to using finely divided supports which can be any organic or inorganic solid. In particular, the support component B) can be a porous support such as talc, a sheet silicate such as montmorillonite, mica, an inorganic oxide or a finely divided polymer powder (e.g. polyolefin or a polymer bearing polar functional groups).

The support materials used preferably have a specific surface area in the range from 10 to 1000 $m^2/g$, a pore volume in the range from 0.1 to 5 mug and a mean particle size of 1 to 500 μm. Preference is given to supports having a specific surface area in the range from 50 to 700 $m^2/g$, a pore volume in the range from 0.4 to 3.5 ml/g and a mean particle size in the range from 5 to 350 μm. Particular preference is given to supports having a specific surface area in the range from 200 to 550 $m^2/g$, a pore volume in the range from 0.5 to 3.0 ml/g and a mean particle size of from 10 to 150 μm.

The inorganic support can be subjected to a thermal treatment, e.g. to remove adsorbed water. Such a drying treatment is generally carried out at temperatures in the range from 80 to 800° C., preferably from 100 to 300° C., with drying at from 100 to 200° C. preferably being carried out under reduced pressure and/or under a blanket of inert gas (e.g. nitrogen), or the inorganic support can be calcined at temperatures of from 200 to 1000° C. to produce the desired structure of the solid and/or the desired OH concentration on the surface. The support can also be treated chemically using customary desiccants such as metal alkyls, preferably aluminum alkyls, chlorosilanes or $SiCl_4$, or else methylaluminoxane. Appropriate treatment methods are described, for example, in WO 00/31090.

The inorganic support material can also be chemically modified. For example, treatment of silica gel with $NH_4SiF_6$ or other fluorinating agents leads to fluorination of the silica gel surface, or treatment of silica gels with silanes comprising nitrogen-, fluorine- or sulfur-comprising groups leads to correspondingly modified silica gel surfaces.

Organic support materials such as finely divided polyolefin powders (e.g. polyethylene, polypropylene or polystyrene) can also be used and are preferably likewise freed of adhering moisture, solvent residues or other impurities by appropriate purification and drying operations before use. It is also possible to use functionalized polymer supports, e.g. ones based on polystyrene, polyethylene or polypropylene, via whose functional groups, for example ammonium or hydroxy groups, at least one of the catalyst components can be fixed.

Inorganic oxides suitable as support component B) may be found among the oxides of elements of groups 2, 3, 4, 5, 13, 14, 15 and 16 of the Periodic Table of the Elements. Examples of oxides preferred as supports include silicon dioxide, aluminum oxide and mixed oxides of the elements calcium, aluminum, silicon, magnesium or titanium and also corresponding oxide mixtures. Other inorganic oxides which can be used alone or in combination with the abovementioned preferred oxidic supports are, for example, MgO, CaO, AlPO$_4$, ZrO$_2$, TiO$_2$, B$_2$O$_3$ or mixtures thereof.

As solid support materials B) for catalysts for olefin polymerization, preference is given to using silica gels since particles whose size and structure make them suitable as supports for olefin polymerization can be produced from this material. Spray-dried silica gels comprising spherical agglomerates of smaller granular particles, i.e. primary particles, have been found to be particularly useful. The silica gels can be dried and/or calcined before use.

Further preferred supports B) are hydrotalcites and calcined hydrotalcites. In mineralogy, hydrotalcite is a natural mineral having the ideal formula $$Mg_6Al_2(OH)_{16}CO_3.4H_2O$$

whose structure is derived from that of brucite Mg(OH)$_2$. Brucite crystallizes in a sheet structure with the metal ions in octahedral holes between two layers of close-packed hydroxyl ions, with only every second layer of the octahedral holes being occupied. In hydrotalcite, some magnesium ions are replaced by aluminum ions, as a result of which the packet of layers gains a positive charge. This is compensated by the anions which are located together with water of crystallization in the layers inbetween.

Such sheet structures are found not only in magnesium-aluminum hydroxides, but also generally in mixed metal hydroxides of the general formula $$M(II)_{2x}^{2+}M(III)_2^{3+}(OH)_{4x+4}.A_{2/n}^{n-}.zH_2O$$

which have a sheet structure and in which M(II) is a divalent metal such as Mg, Zn, Cu, Ni, Co, Mn, Ca and/or Fe and M(III) is a trivalent metal such as Al, Fe, Co, Mn, La, Ce and/or Cr, x is from 0.5 to 10 in steps of 0.5, A is an interstitial anion and n is the charge on the interstitial anion which can be from 1 to 8, usually from 1 to 4, and z is an integer from 1 to 6, in particular from 2 to 4. Possible interstitial anions are organic anions such as alkoxide anions, alkyl ether sulfates, aryl ether sulfates or glycol ether sulfates, inorganic anions such as, in particular, carbonate, hydrogencarbonate, nitrate, chloride, sulfate or B(OH)$_4^-$ or polyoxo metal anions such as Mo$_7$O$_{24}^{6-}$ or V$_{10}$O$_{28}^{6-}$. However, a mixture of a plurality of such anions can also be present.

Accordingly, all such mixed metal hydroxides having a sheet structure should be regarded as hydrotalcites for the purposes of the present invention.

Calcined hydrotalcites can be prepared from hydrotalcites by calcination, i.e. heating, by means of which, inter alia, the desired hydroxyl group content can be set. In addition, the crystal structure also changes. The preparation of the calcined hydrotalcites used according to the invention is usually carried out at temperatures above 180° C. Preference is given to calcination for from 3 to 24 hours at from 250° C. to 1000° C., in particular from 400° C. to 700° C. It is possible for air or inert gas to be passed over the solid during calcination or for a vacuum to be applied.

On heating, the natural or synthetic hydrotalcites firstly give off water, i.e. drying occurs. On further heating, the actual calcination, the metal hydroxides are converted into the metal oxides by elimination of hydroxyl groups and interstitial anions; OH groups or interstitial anions such as carbonate can also still be present in the calcined hydrotalcites. A measure of this is the loss on ignition. This is the weight loss experienced by a sample which is heated in two steps firstly for 30 minutes at 200° C. in a drying oven and then for 1 hour at 950° C. in a muffle furnace.

The calcined hydrotalcites used as component B) are thus mixed oxides of the divalent and trivalent metals M(II) and M(III), with the molar ratio of M(II) to M(III) generally being in the range from 0.5 to 10, preferably from 0.75 to 8 and in particular from 1 to 4. Furthermore, normal amounts of impurities, for example Si, Fe, Na, Ca or Ti and also chlorides and sulfates, can also be present.

Preferred calcined hydrotalcites B) are mixed oxides in which M(II) is magnesium and M(III) is aluminum. Such aluminum-magnesium mixed oxides are obtainable from Condea Chemie GmbH (now Sasol Chemie), Hamburg, under the trade name Puralox Mg.

Preference is also given to calcined hydrotalcites in which the structural transformation is complete or virtually complete. Calcination, i.e. transformation of the structure, can be confirmed, for example, by means of X-ray diffraction patterns.

The hydrotalcites, calcined hydrotalcites or silica gels employed are generally used as finely divided powders having a mean particle diameter D50 of from 5 to 200 µm, preferably from 10 to 150 µm, particularly preferably from 15 to 100 µm and in particular from 20 to 70 µm, and usually have pore volumes of from 0.1 to 10 cm$^3$/g, preferably from 0.2 to 5 cm$^3$/g, and specific surface areas of from 30 to 1000 m$^2$/g, preferably from 50 to 800 m$^2$/g and in particular from 100 to 600 m$^2$/g. The monocyclopentadienyl complexes of the invention are preferably applied in such an amount that the concentration of the transition metal complex in the finished catalyst system is from 5 to 200 µmol, preferably from 20 to 100 µmol and particularly preferably from 25 to 70 µmol per g of support B).

Some of the monocyclopentadienyl complexes of the invention have little polymerization activity on their own and are then brought into contact with an activator, viz. the component C), to be able to display good polymerization activity. For this reason, the catalyst system optionally further comprises, as component C), one or more activating compounds, preferably at least one cation-forming compound C).

Suitable compounds C) which are able to react with the monocyclopentadienyl complex A) to convert it into a catalytically active, or more active, compound are, for example, compounds such as an aluminoxane, a strong uncharged Lewis acid, an ionic compound having a Lewis-acid cation or an ionic compound comprising a Brönsted acid as cation.

As aluminoxanes, it is possible to use, for example, the compounds described in WO 00/31090. Particularly useful aluminoxanes are open-chain or cyclic aluminoxane compounds of the general formula (X) or (XI)

(X)

(XI)

where R$^{1C}$-R$^{4C}$ are each, independently of one another, a C$_1$-C$_6$-alkyl group, preferably a methyl, ethyl, butyl or isobutyl group, and l is an integer from 1 to 30, preferably from 5 to 25.

A particularly useful aluminoxane compound is methylaluminoxane.

These oligomeric aluminoxane compounds are usually prepared by controlled reaction of a solution of trialkylaluminum with water. In general, the oligomeric aluminoxane compounds obtained in this way are in the form of mixtures of both linear and cyclic chain molecules of various lengths, so that I is to be regarded as a mean. The aluminoxane compounds can also be present in admixture with other metal alkyls, usually aluminum alkyls. Aluminoxane preparations suitable as component C) are commercially available.

Furthermore, modified aluminoxanes in which some of the hydrocarbon radicals have been replaced by hydrogen atoms or alkoxy, aryloxy, siloxy or amide radicals can also be used as component C) in place of the aluminoxane compounds of the general formula (X) or (XI).

It has been found to be advantageous to use the monocyclopentadienyl complexes A) and the aluminoxane compounds in such amounts that the atomic ratio of aluminum from the aluminoxane compounds including any aluminum alkyl still present to the transition metal from the monocyclopentadienyl complex A) is in the range from 1:1 to 1000:1, preferably from 10:1 to 500:1 and in particular in the range from 20:1 to 400:1.

A further class of suitable activating components C) are hydroxyaluminoxanes. These can be prepared, for example, by addition of from 0.5 to 1.2 equivalents of water, preferably from 0.8 to 1.2 equivalents of water, per equivalent of aluminum to an alkylaluminum compound, in particular triisobutylaluminum, at low temperatures, usually below 0° C. Such compounds and their use in olefin polymerization are described, for example, in WO 00/24787. The atomic ratio of aluminum from the hydroxyaluminoxane compound to the transition metal from the monocyclopentadienyl complex A) is usually in the range from 1:1 to 100:1, preferably from 10:1 to 50:1 and in particular in the range from 20:1 to 40:1. Preference is in this case given to using a monocyclopentadienyl metal dialkyl compound A).

As strong, uncharged Lewis acids, preference is given to compounds of the general formula (XII)

where $M^{1C}$ is an element of group 13 of the Periodic Table of the Elements, in particular B, Al or Ga, preferably B, $X^{1C}$, $X^{2C}$ and $X^{3C}$ are each hydrogen, $C_1$-$C_{10}$-alkyl, $C_6$-$C_{15}$-aryl, alkylaryl, arylalkyl, haloalkyl or haloaryl each having from 1 to 10 carbon atoms in the alkyl radical and from 6 to 20 carbon atoms in the aryl radical or fluorine, chlorine, bromine or iodine, in particular haloaryls, preferably pentafluorophenyl.

Further examples of strong, uncharged Lewis acids are given in WO 00/31090.

Compounds of this type which are particularly useful as component C) are boranes and boroxins such as trialkylborane, triarylborane or trimethylboroxin. Particular preference is given to using boranes which bear at least two perfluorinated aryl radicals. Particular preference is given to compounds of the general formula (XII) in which $X^{1C}$, $X^{2C}$ and $X^{3C}$ are identical, preferably tris(pentafluorophenyl)borane.

Suitable compounds C) are preferably prepared by reaction of aluminum or boron compounds of the formula (XII) with water, alcohols, phenol derivatives, thiophenol derivatives or aniline derivatives, with halogenated and especially perfluorinated alcohols and phenols being of particular importance. Examples of particularly useful compounds are pentafluorophenol, 1,1-bis-(pentafluorophenyl)methanol and 4-hydroxy-2,2',3,3',4',5,5',6,6'-nonafluorobiphenyl. Examples of combinations of compounds of the formula (XII) with Brönsted acids are, in particular, trimethyl-aluminum/pentafluorophenol, trimethylaluminum/1-bis(pentafluorophenyl)methanol, trimethyl-aluminum/4-hydroxy-2,2',3,3',4',5,5',6,6'-nonafluorobiphenyl, triethylaluminum/pentafluorophenol and triisobutylaluminum/pentafluorophenol and triethytaluminum/4,4'-dihydroxy-2,2',3,3',5,5',6,6'-octafluorobiphenyl hydrate.

In further suitable aluminum and boron compounds of the formula (XII), $X^{1C}$ is an OH group. Examples of compounds of this type are boronic acids and borinic acids, in particular borinic acids having perfluorinated aryl radicals, for example $(C_6F_5)_2BOH$.

Strong uncharged Lewis acids suitable as activating compounds C) also include the reaction products of a boronic acid with two equivalents of an aluminum trialkyl or the reaction products of an aluminum trialkyl with two equivalents of an acidic fluorinated, in particular perfluorinated, carbon compound such as pentafluorophenol or bis(pentafluorophenyl)borinic acid.

Suitable ionic compounds having Lewis-acid cations include salt-like compounds of the cation of the general formula (XIII)

where $M^{2C}$ is an element of groups 1 to 16 of the Periodic Table of the Elements, $Q_1$ to $Q_z$ are singly negatively charged groups such as $C_1$-$C_{28}$-alkyl, $C_6$-$C_{15}$-aryl, alkylaryl, arylalkyl, haloalkyl, haloaryl each having from 6 to 20 carbon atoms in the aryl radical and from 1 to 28 carbon atoms in the alkyl radical, $C_3$-$C_{10}$-cycloalkyl which may bear $C_1$-$C_{10}$-alkyl groups as substituents, halogen, $C_1$-$C_{28}$-alkoxy, $C_6$-$C_{15}$-aryloxy, silyl or mercaptyl groups, a is an integer from 1 to 6 and z is an integer from 0 to 5, d corresponds to the difference a-z, but d is greater than or equal to 1.

Particularly useful cations are carbonium cations, oxonium cations and sulfonium cations and also cationic transition metal complexes. Particular mention may be made of the triphenylmethyl cation, the silver cation and the 1,1'-dimethylferrocenyl cation. They preferably have noncoordinating counterions, in particular boron compounds as are also mentioned in WO 91/09882, preferably tetrakis(pentafluorophenyl)borate.

Salts having noncoordinating anions can also be prepared by combining a boron or aluminum compound, e.g. an aluminum alkyl, with a second compound which can react to link two or more boron or aluminum atoms, e.g. water, and a third compound which forms an ionizing ionic compound with the boron or aluminum compound, e.g. triphenylchloromethane, or optionally a base, preferably an organic nitrogen-comprising base, for example an amine, an aniline derivative or a nitrogen heterocycle. In addition, a fourth compound which likewise reacts with the boron or aluminum compound, e.g. pentafluorophenol, can be added.

Ionic compounds comprising Brönsted acids as cations preferably likewise have noncoordinating counterions. As Brönsted acid, particular preference is given to protonated amine or aniline derivatives. Preferred cations are N,N-dimethylanilinium, N,N-dimethylcyclohexylammonium and N,N-dimethylbenzylammonium and also derivatives of the latter two.

Compounds comprising anionic boron heterocycles as are described in WO 9736937 are also suitable as component C), in particular dimethylanilinium boratabenzene or trityl boratabenzene.

Preferred ionic compounds C) comprise borates which bear at least two perfluorinated aryl radicals. Particular preference is given to N,N-dimethylanilinium tetrakis(pentafluorophenyl)borate and in particular N,N-dimethylcyclohexylammonium tetrakis(pentafluorophenyl)borate, N,N-dimethylbenzylammonium tetrakis(pentafluorophenyl)borate or trityl tetrakispentafluorophenylborate.

It is also possible for two or more borate anions and/or boranes to be joined to one another or for a borate anion to be joined to a borane, as in the dianion $[(C_6F_5)_3B—C_6F_4—B(C_6F_5)_3]^{2-}$ or the anion $[(C_6F_5)_3B—CN—B(C_6F_5)_3]^-$, or the borate anion can be bound via a bridge bearing a suitable functional group to the support surface.

Further suitable activating compounds C) are listed in WO 00/31090.

The amount of strong, uncharged Lewis acids, ionic compounds having Lewis-acid cations or ionic compounds comprising Brönsted acids as cations is preferably from 0.1 to 20 equivalents, more preferably from 1 to 10 equivalents, based on the monocyclopentadienyl complex A).

Suitable activating compounds C) also include boron-aluminum compounds such as di[bis(pentafluorophenyl)boroxy]methylalane. Examples of such boron-aluminum compounds are those disclosed in WO 99/06414.

It is also possible to use mixtures of all the abovementioned activating compounds C). Preferred mixtures comprise aluminoxanes, in particular methylaluminoxane, and an ionic compound, in particular one comprising the tetrakis(pentafluorophenyl)borate anion, and/or a strong uncharged Lewis acid, in particular tris(pentafluorophenyl)borane.

Both the monocyclopentadienyl complexes A) and the activating compounds C) are preferably used in a solvent, preferably an aromatic hydrocarbon having from 6 to 20 carbon atoms, in particular xylenes, toluene, pentane, hexane, heptane or a mixture thereof.

A further possibility is to use an activating compound C) which can simultaneously be employed as support B). Such systems are obtained, for example, from an inorganic oxide by treatment with zirconium alkoxide and subsequent chlorination, for example by means of carbon tetrachloride. The preparation of such systems is described, for example, in WO 01/41920.

A likewise broad product spectrum can be achieved by use of the monocyclopentadienyl complexes A) of the invention in combination with at least one further catalyst D) which is suitable for the polymerization of olefins. It is therefore possible to use one or more catalysts suitable for olefin polymerization as optional component D) in the catalyst system. Possible catalysts D) are, in particular, classical Ziegler-Natta catalysts based on titanium and classical Phillips catalysts based on chromium oxides.

Possible components D) are in principle all compounds of transition metals of groups 3 to 12 of the Periodic Table or the lanthanides which comprise organic groups and preferably form active catalysts for olefin polymerization after reaction with the components C) in the presence of A) and optionally B) and/or E). These are usually compounds in which at least one monodentate or polydentate ligand is bound to the central atom via a sigma or pi bond. Possible ligands include both ligands comprising cyclopentadienyl radicals and ligands which are free of cyclopentadienyl radicals. A large number of such compounds B) suitable for olefin polymerization are described in Chem. Rev. 2000, Vol, 100, No. 4. Furthermore, multinuclear cyclopentadienyl complexes are also suitable for olefin polymerization.

Particularly well-suited components D) also include compounds having at least one cyclopentadienyl ligand, which are generally referred to as metallocene complexes. Particularly useful metallocene complexes are those of the general formula (XIV)

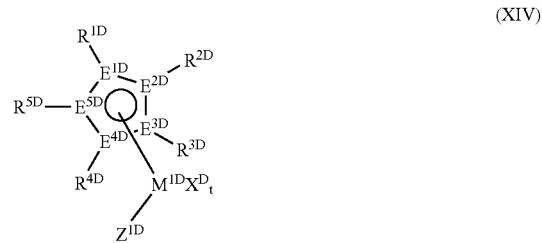

(XIV)

where the substituents and indices have the following meanings:

$M^{1D}$ is titanium, zirconium, hafnium, vanadium, niobium, tantalum, chromium, molybdenum or tungsten, or an element of group 3 of the Periodic Table and the lanthanides, $X^D$ is fluorine, chlorine, bromine, iodine, hydrogen, $C_1$-$C_{10}$-alkyl, $C_2$-$C_{10}$-alkenyl, $C_6$-$C_{15}$-aryl, alkylaryl having from 1 to 10 carbon atoms in the alkyl radical and from 6 to 20 carbon atoms in the aryl radical, —$OR^{6D}$ or —$NR^{6D}R^{7D}$, or two radicals $X^D$ form a substituted or unsubstituted diene ligand, in particular a 1,3-diene ligand, and the radicals $X^D$ are identical or different and may be joined to one another, $E^{1D}$-$E^{5D}$ are each carbon or not more than one $E^{1D}$ to $E^{5D}$ is phosphorus or nitrogen, preferably carbon, t is 1, 2 or 3 and is such that, depending on the valence of MID, the metallocene complex of the general formula (XIV) is uncharged, where $R^{6D}$ and $R^{7D}$ are each $C_1$-$C_{10}$-alkyl, $C_6$-$C_{15}$-aryl, alkylaryl, arylalkyl, fluoroalkyl or fluoroaryl each having from 1 to 10 carbon atoms in the alkyl radical and from 6 to 20 carbon atoms in the aryl radical and $R^{1D}$ to $R^{5D}$ are each, independently of one another, hydrogen, $C_1$-$C_{22}$-alkyl, 5- to 7-membered cycloalkyl or cycloalkenyl which may in turn bear $C_1$-$C_{10}$-alkyl groups as substituents, $C_2$-$C_{22}$-alkenyl, $C_6$-$C_{22}$-aryl, arylalkyl having from 1 to 16 carbon atoms in the alkyl radical and from 6 to 21 carbon atoms in the aryl radical, $NR^{8D}{}_2$, $N(SiR^{8D}{}_3)_2$, $OR^{8D}$, $OSiR^{8D}{}_3$, $SiR^{8D}{}_3$, where the organic radicals $R^{1D}$-$R^{5D}$ may also be substituted by halogens and/or two radicals $R^{1D}$-$R^{5D}$, in particular vicinal radicals, may also be joined to form a five-, six- or seven-membered ring, and/or two vicinal radicals $R^{1D}$-$R^{5D}$ may be joined to form a five-, six- or seven-membered heterocycle which comprises at least one atom from the group consisting of N, P, O and S, where the radicals $R^{8D}$ can be identical or different and are each $C_1$-$C_{10}$-alkyl, $C_3$-$C_{11}$-cycloalkyl, $C_6$-$C_{15}$-aryl, $C_1$-$C_4$-alkoxy or $C_6$-$C_{10}$-aryloxy and $Z^{1D}$ is defined as for $X^D$ or

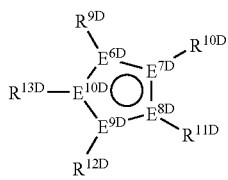

where the radicals
$R^{9D}$ to $R^{13D}$ are each, independently of one another, hydrogen, $C_1$-$C_{22}$-alkyl, 5- to 7-membered cycloalkyl or cycloalkenyl which may in turn bear $C_1$-$C_{10}$-alkyl groups as substituents, $C_2$-$C_{22}$-alkenyl, $C_6$-$C_{22}$-aryl, arylalkyl having from 1 to 16 carbon atoms in the alkyl radical and 6-21 carbon atoms in the aryl radical, $NR^{14D}_2$, $N(SiR^{14D}_3)_2$, $OR^{14D}$, $OSiR^{14D}_3$, $SiR^{14D}_3$, where the organic radicals $R^{9D}$-$R^{13D}$ may also be substituted by halogens and/or two radicals $R^{9D}$-$R^{13D}$, in particular vicinal radicals, may also be joined to form a five-, six- or seven-membered ring, and/or two vicinal radicals $R^{9D}$-$R^{13D}$ may be joined to form a five-, six- or seven-membered heterocycle which comprises at least one atom from the group consisting of N, P, O and S, where
the radicals $R^{14D}$ are identical or different and are each $C_1$-$C_{10}$-alkyl, $C_3$-$C_{10}$-cycloalkyl, $C_6$-$C_{15}$-aryl, $C_1$-$C_4$-alkoxy or $C_6$-$C_{10}$-aryloxy,
$E^{6D}$-$E^{10D}$ are each carbon or not more than one $E^{6D}$ to $E^{10D}$ is phosphorus or nitrogen, preferably carbon
or the radicals $R^{4D}$ and $Z^{1D}$ together form an —$R^{15D}_v$-$A^{1D}$- group in which $R^{15D}$

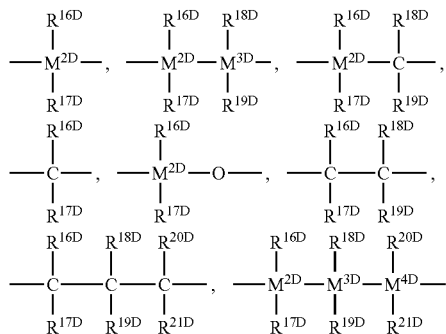

$=BR^{16D}$, $=BNR^{16D}R^{17D}$, $=AlR^{16D}$, —Ge—, —Sn—, —O—, —S—, $=SO$, $=SO_2$, $=NR^{16D}$, $=CO$, $=PR^{16D}$ or $=P(O)R^{16D}$,
where
$R^{16D}$-$R^{21D}$ are identical or different and are each a hydrogen atom, a halogen atom, a trimethylsilyl group, a $C_1$-$C_{10}$-alkyl group, a $C_1$-$C_{10}$-fluoroalkyl group, a $C_6$-$C_{10}$-fluoroaryl group, a $C_6$-$C_{10}$-aryl group, a $C_1$-$C_{10}$-alkoxy group, a $C_7$-$C_{15}$-alkylaryloxy group, a $C_2$-$C_{10}$-alkenyl group, a $C_7$-$C_{40}$-arylalkyl group, a $C_8$-$C_{40}$-arylalkenyl group or a $C_7$-$C_{40}$-alkylaryl group or two adjacent radicals together with the atoms connecting them form a saturated or unsaturated ring having from 4 to 15 carbon atoms, and
$M^{2D}$-$M^{4D}$ are each silicon, germanium or tin, preferably silicon, $A^{1D}$ is —O—, —S—, —$NR^{22D}$—, —$PR^{22D}$—, $=O$, $=S$, $=NR^{22D}$, —O—$R^{22D}$, —$NR^{22D}_2$, —$PR^{22D}_2$ or an unsubstituted, substituted or fused heterocyclic ring system, where
the radicals $R^{22D}$ are each, independently of one another, $C_1$-$C_{10}$-alkyl, $C_6$-$C_{15}$-aryl, $C_3$-$C_{10}$-cycloalkyl, $C_7$-$C_{18}$-alkylaryl or $Si(R^{23D})_3$,
$R^{23D}$ is hydrogen, $C_1$-$C_{10}$-alkyl, $C_6$-$C_{15}$-aryl which may in turn bear $C_1$-$C_4$-alkyl groups as substituents or $C_3$-$C_{10}$-cycloalkyl,
v is 1 or when $A^{1D}$ is an unsubstituted, substituted or fused heterocyclic ring system may also be 0
or the radicals $R^{4D}$ and $R^{12D}$ together form an —$R^{15D}$— group.

$A^{1D}$ together with the bridge $R^{15D}$ can, for example, form an amine, ether, thioether or phosphine. However, $A^{1D}$ may also be an unsubstituted, substituted or fused heterocyclic aromatic ring system which can comprise heteroatoms from the group consisting of oxygen, sulfur, nitrogen and phosphorus in addition to carbon atoms in the ring. Examples of five-membered heteroaryl groups which can comprise from one to four nitrogen atoms and/or a sulfur or oxygen atom as ring atoms in addition to carbon atoms are 2-furyl, 2-thienyl, 2-pyrrolyl, 3-isoxazolyl, 5-isoxazolyl, 3-iso-thiazolyl, 5-isothiazolyl, 1-pyrazolyl, 3-pyrazolyl, 5-pyrazolyl, 2-oxazolyl, 4-oxazolyl, 5-oxazolyl, 2-thiazolyl, 4-thiazolyl, 5-thiazolyl, 2-imidazolyl, 4-imidazolyl, 5-imidazolyl, 1,2,4-oxadiazol-3-yl, 1,2,4-oxadiazol-5-yl, 1,3,4-oxadiazol-2-yl and 1,2,4-triazol-3-yl. Examples of 6-membered heteroaryl groups, which can comprise from one to four nitrogen atoms and/or a phosphorus atom, are 2-pyridinyl, 2-phosphaphenyl, 3-pyridazinyl, 2-pyrimidinyl, 4-pyrimidinyl, 2-pyrazinyl, 1,3,5-triazin-2-yl and 1,2,4-triazin-3-yl, 1,2,4-triazin-5-yl and 1,2,4-triazin-6-yl. The 5-membered and 6-membered heteroaryl groups can also be substituted by $C_1$-$C_{10}$-alkyl, $C_6$-$C_{10}$-aryl, alkylaryl having from 1 to 10 carbon atoms in the alkyl radical and 6-10 carbon atoms in the aryl radical, trialkylsilyl or halogens such as fluorine, chlorine or bromine or be fused with one or more aromatics or heteroaromatics. Examples of benzo-fused 5-membered heteroaryl groups are 2-indolyl, 7-indolyl, 2-coumaronyl, 7-coumaronyl, 2-thianaphthenyl, 7-thianaphthenyl, 3-indazolyl, 7-indazolyl, 2-benzimidazolyl and 7-benzimidazolyl. Examples of benzo-fused 6-membered heteroaryl groups are 2-quinolyl, 8-quinolyl, 3-cinnolyl, 8-cinnolyl, 1-phthalazyl, 2-quinazolyl, 4-quinazolyl, 8-quinazolyl, 5-quinoxalyl, 4-acridyl, 1-phenanthridyl and 1-phenazyl. Naming and numbering of the heterocycles has been taken from L. Fieser and M. Fieser, Lehrbuch der organischen Chemie, 3rd revised edition, Verlag Chemie, Weinheim 1957.

It is preferred that the radicals $X^D$ in the general formula (XIV) are identical, preferably fluorine, chlorine, bromine, $C_1$-$C_7$-alkyl or aralkyl, in particular chlorine, methyl or benzyl.

The synthesis of such complexes can be carried out by methods known per se, preferably by reaction of the appropriately substituted, cyclic hydrocarbon anions with halides of titanium, zirconium, hafnium or chromium.

Among the metallocene complexes of the general formula (XIV), preference is given to

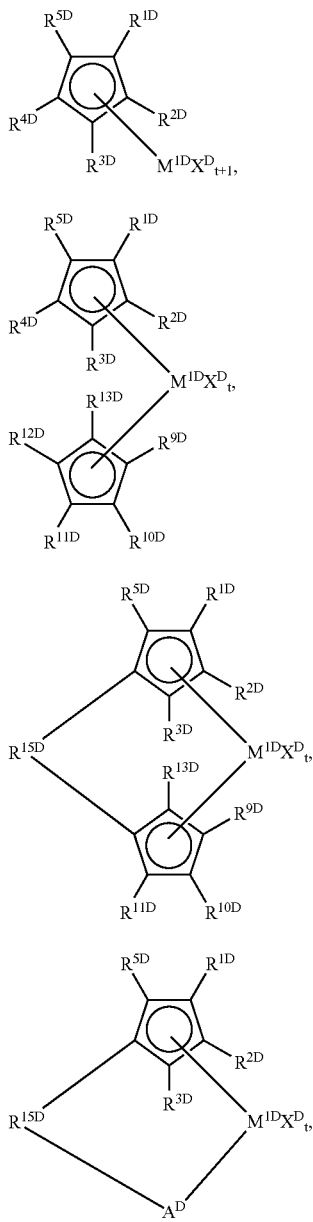

Among the compounds of the formula (XIVa), particular preference is given to those in which $M^{1D}$ is titanium, vanadium or chromium, $X^D$ is chlorine, $C_1$-$C_4$-alkyl, phenyl, alkoxy or aryloxy, t is 1 or 2 and $R^{1D}$ to $R^{5D}$ are each hydrogen, $C_1$-$C_6$-alkyl or two adjacent radicals $R^{1D}$ to $R^{5D}$ form a substituted or unsubstituted benzo group.

Among the compounds of the formula (XIVb), preference is given to those in which $M^{1D}$ is titanium, zirconium, vanadium, hafnium or chromium, $X^D$ is fluorine, chlorine, $C_1$-$C_4$-alkyl or benzyl, or two radicals $X^D$ form a substituted or unsubstituted butadiene ligand, t is 0 in the case of chromium, otherwise 1 or 2, preferably 2, $R^{1D}$ to $R^{5D}$ are each hydrogen, $C_1$-$C_8$-alkyl, $C_6$-$C_8$-aryl, $NR^{8D}{}_2$, $OSiR^{8D}{}_3$ or $Si(R^{8D})_3$ and $R^{9D}$ to $R^{5D}$ are each hydrogen, $C_1$-$C_8$-alkyl or $C_6$-$C_8$-aryl, $NR^{14D}{}_2$, $OSiR^{14D}{}_3$ or $Si(R^{14D})_3$ or two radicals $R^{1D}$ to $R^{5D}$ and/or $R^{9D}$ to $R^{13D}$ together with the $C_5$ ring form an indenyl, fluorenyl or substituted indenyl or fluorenyl system.

The compounds of the formula (XIVb) in which the cyclopentadienyl radicals are identical are particularly useful.

Examples of particularly useful compounds D) of the formula (XIVb) include: bis(cyclopentadienyl)chromium, bis(indenyl)titanium dichloride, bis(fluorenyl)titanium dichloride, bis(tetrahydroindenyl)titanium dichloride, bis(pentamethylcyclopentadienyl)titanium dichloride, bis(trimethylsilylcyclopentadienyl)titanium dichloride, bis(trimethoxysilylcyclopentadienyl)titanium dichloride, bis(isobutylcyclopentadienyl)titanium dichloride, bis(3-butenylcyclopentadienyl)titanium dichloride, bis(methylcyclopentadienyl)titanium dichloride, bis(1-,3-di-tert-butylcyclopentadienyl)-titanium dichloride, bis(trifluoromethylcyclopentadienyl)titanium dichloride, bis(tert-butylcyclo-pentadienyl)titanium dichloride, bis(n-butylcyclopentadienyl)titanium dichloride, bis(phenylcyclopentadienylititanium dichloride, bis(N,N-dimethylaminomethylcyclopentadienyl)titanium dichloride, bis(1,3-dimethylcyclopentadienyl)titanium dichloride, bis(1-methyl-3-n-butylcyclopentadienyl)-titanium dichloride, (cyclopentadienyl)(methylcyclopentadienyl)titanium dichloride, (cyclopenta-dienyl)(n-butylcyclopentadienyl)titanium dichloride, (methylcyclopentadienyl)(n-butylcyclopenta-dienyl)titanium dichloride, (cyclopentadienyl)(1-methyl-3-n-butylcyclopentadienyl)titanium dichloride, bis(cyclopentadienyl)zirconium dichloride, bis(pentamethylcyclopentadienyl)zirconium dichloride, bis(methylcyclopentadienyl)zirconium dichloride, bis(ethylcyclopentadienyl)zirconium dichloride, bis(n-butylcyclopentadienyl)zirconium dichloride, bis(tert-butylcyclopentadienyl)-zirconium dichloride, bis(isobutylcyclopentadienyl)zirconium dichloride, bis(3-butenylcyclopentadienyl)zirconium dichloride, bis(trifluoromethylcyclopentadienyl)zirconium dichloride, bis(phenyl-cyclopentadienyl)zirconium dichloride, bis(1,3-dimethylcyclopentadienyl)zirconium dichloride, bis(1-n-butyl-3-methylcyclopentadienyl)zirconium dichloride, bis(1,3-ditert-butylcyclopentadienyl)-zirconium dichloride, bis(tetramethylcyclopentadienyl)zirconium dichloride, bis(indenyl)zirconium dichloride, bis(tetrahydroindenyl)zirconium dichloride, bis(fluorenyl)zirconium dichloride, (cyclopentadienyl)(methylcyclopentadienyl)zirconium dichloride, (cyclopentadienyl)(n-butylcyclopenta-dienyl)zirconium dichloride, (methylcyclopentadienyl)(n-butylcyclopentadienyl)zirconium dichloride, (cyclopentadienyl)(1-methyl-3-n-butylcyclopentadienyl)zirconium dichloride, bis(trimethoxysilylcyclopentadienyl)zirconium dichloride and bis(trimethylsilylcyclopentadienyl)-zirconium dichloride, and also the corresponding dimethylzirconium compounds.

Particularly useful compounds of the formula (XIVc) are those in which
R$^{15D}$ is

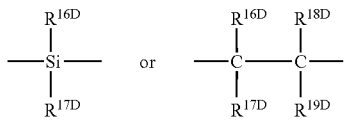

or =BR$^{16D}$ or =BNR$^{16D}$R$^{17D}$,

M$^{1D}$ is titanium, zirconium or hafnium, in particular zirconium, and the radicals X$^1$ are identical or different and are each chlorine, C$_1$-C$_4$-alkyl, benzyl, phenyl or C$_7$-C$_{15}$-alkylaryloxy.

Particularly useful compounds of the formula (XVIc) are those of the formula (XVIc')

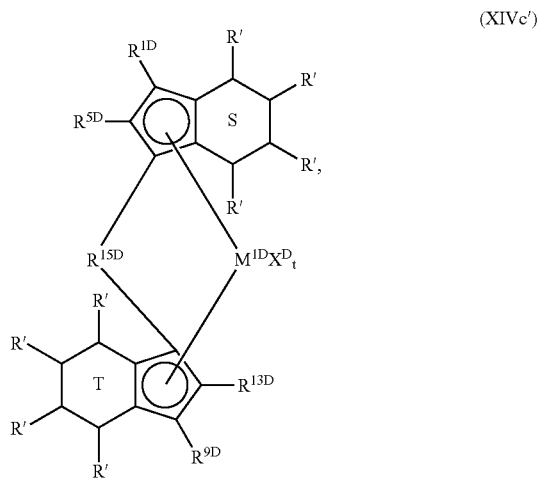

(XIVc')

where the radicals R' are identical or different and are each hydrogen, C$_1$-C$_{10}$-alkyl or C$_3$-C$_{10}$-cycloalkyl, preferably methyl, ethyl, isopropyl or cyclohexyl, C$_6$-C$_{20}$-aryl, preferably phenyl, naphthyl or mesityl, C$_7$-C$_{40}$-arylalkyl, C$_7$-C$_{40}$-alkylaryl, preferably 4-tert-butylphenyl or 3,5-di-tert-butylphenyl, or C$_8$-C$_{40}$-arylalkenyl, R$^{5D}$ and R$^{13D}$ are identical or different and are each hydrogen, C$_1$-C$_6$-alkyl, preferably methyl, ethyl, isopropyl, n-propyl, n-butyl, n-hexyl or tert-butyl, and the rings S and T are identical or different and saturated, unsaturated or partially saturated.

The indenyl or tetrahydroindenyl ligands of the metallocenes of the formula (XIVc') are preferably substituted in the 2 position, the 2,4 positions, the 4,7 positions, the 2,4,7 positions, the 2,6 positions, the 2,4,6 positions, the 2,5,6 positions, the 2,4,5,6 positions or the 2,4,5,6,7 positions, in particular in the 2,4 positions, with the following numbering applying to the site of substitution:

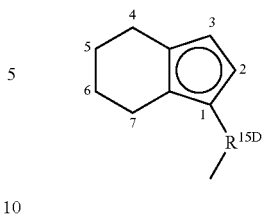

Furthermore, preference is given to using bridged bis-indenyl complexes in the rac or pseudo-rac form as component D). The term "pseudo-rac form" refers to complexes in which the two indenyl ligands are in the rac arrangement relative to one another when all other substituents of the complex are disregarded.

Further examples of particularly useful catalysts D) (XIVc) and (XIVc') include: methylenebis(cyclopentadienyl)zirconium dichloride, methylenebis(3-methylcyclopentadienyl)-zirconium dichloride, methylenebis(3-n-butylcyclopentadienyl)zirconium dichloride, methylenebis-(indenyl)zirconium dichloride, methylenebis (tetrahydroindenyl)zirconium dichloride, isopropylidenebis (cyclopentadienyl)zirconium dichloride, isopropylidenebis (3-trimethylsilylcyclopentadienyl)zirconium dichloride, isopropylidenebis(3-methylcyclopentadienyl)zirconium dichloride, isopropylidenebis(3-n-butylcyclopentadienyl) zirconium dichloride, isopropylidenebis-(3-phenylcyclopentadienyl)zirconium dichloride, isopropylidenebis(indenyl) zirconium dichloride, isopropylidenebis(tetrahydroindenyl) zirconium dichloride, dimethylsilanediylbis(cyclopentadienyl)zirconium dichloride, dimethylsilanediylbis(indenyl) zirconium dichloride, dimethyl-silanediylbis (tetrahydroindenyl)zirconium dichloride, ethylenebis (cyclopentadienyl)zirconium dichloride, ethylenebis (indenyl)zirconium dichloride, ethylenebis (tetrahydroindenyl)zirconium dichloride, tetramethylethylen-9-fluorenylcyclopentadienylzirconium dichloride, dimethylsilanediyl-bis(tetramethylcyclopentadienyl)zirconium dichloride, dimethylsilanediylbis(3-trimethylsilylcyclo-pentadienyl)zirconium dichloride, dimethylsilanediylbis(3-methylcyclopentadienyl)zirconium dichloride, dimethylsilanediylbis(3-n-butylcyclopentadienyl)zirconium dichloride, dimethyl-silanediylbis(3-tert-butyl-5-methylcyclopentadienyl)zirconium dichloride, dimethylsilanediylbis-(3-tert-butyl-5-ethylcyclopentadienyl)zirconium dichloride, dimethylsilanediylbis(2-methylindenyl)-zirconium dichloride, dimethylsilanediylbis(2-isopropylindenyl)zirconium dichloride, dimethylsilane-diylbis(2-tert-butylindenyl)zirconium dichloride, diethylsilanediylbis(2-methylindenyl)zirconium dibromide, dimethylsilanediylbis(3-methyl-5-methylcyclopentadienyl)zirconium dichloride, dimethylsilanediylbis(3-ethyl-5-isopropyleyclopentadienyl) zirconium dichloride, dimethylsilanediyl-bis(2-ethylindenyl)zirconium dichloride, dimethylsilanediylbis(2-methyl-4,5-benzindenyl)zirconium dichloride, dimethylsilanediylbis (2-ethyl-4,5-benzindenyl)zirconium dichloride, methylphenyl-silanediylbis(2-methyl-4,5-benzindenyl)zirconium dichloride, methylphenylsilanediylbis(2-ethyl-4,5-benzindenyl)zirconium dichloride, diphenylsilanediylbis(2-methyl-4,5-benzindenyl)zirconium dichloride, diphenylsilanediylbis(2-ethyl-4,5-benzindenyl)zirconium dichloride, diphenylsilane-diylbis(2-methylindenyl)hafnium dichloride, dimethylsilanediylbis(2-methyl-4-phenylindenyl)-zirconium dichloride, dimethylsilanediylbis(2-ethyl-4-phenylindenyl)zirconium dichloride, dimethylsilanediylbis (2-methyl-4-(1-naphthyl)indenyl)zirconium dichloride, dimethylsilanediylbis-(2-ethyl-4-(1-naphthyl)indenyl)zirconium dichloride, dimethylsilanediylbis(2-propyl-4-(1-naphthyl)-indenyl)zirconium dichloride, dimethylsilanediylbis(2-1-butyl-4-(1-naphthyl)indenyl)zirconium dichloride, dimethylsilanediylbis(2-propyl-4-(9-phenanthryl)indenyl) zirconium dichloride, dimethyl-silanediylbis(2-methyl-4-isopropylindenyl)zirconium dichloride, dimethylsilanediylbis(2,7-dimethyl-4-isopropylindenyl)zirconium dichloride, dimethylsilanediylbis(2-methyl-4,6-diisopropylindenyl)-zirconium dichloride, dimethylsilanediylbis(2-methyl-4-[p-trifluoromethylphenyl]indenyl)zirconium dichloride, dimethylsilanediylbis(2-methyl-4-[3',5'-dimethylphenyl]indenyl)zirconium dichloride, dimethylsilanediylbis(2-methyl-4-[4'-tert-butylphenyl]indenyl)zirconium dichloride, diethylsilane-diylbis(2-methyl-4-[4'-tert-butylphenyl]indenyl) zirconium dichloride, dimethylsilanediylbis(2-ethyl-4-[4'-tert-butylphenyl]indenyl)zirconium dichloride, dimethylsilanediylbis(2-propyl-4-[4'-tert-butyl-phenyl]indenyl) zirconium dichloride, dimethylsilanediylbis(2-isopropyl-4-[4'-tert-butylphenyl]-indenyl)zirconium dichloride, dimethylsilanediylbis(2-n-butyl-4-[4'-tert-butylphenyl]indenyl)-zirconium dichloride, dimethylsilanediylbis(2-hexyl-4-[4'-tert-butylphenyl]indenyl)zirconium dichloride, dimethylsilanediyl(2-isopropyl-4-phenylindenyl)-(2-methyl-4-phenylindenyl)zirconium dichloride, dimethylsilanediyl(2-isopropyl-4-(1-naphthyl)indenyl)-(2-methyl-4-(1-naphthyl) indenyl)-zirconium dichloride, dimethylsilanediyl(2-isopropyl-4-[4'-tert-butylphenyl]indenyl)-(2-methyl-4-[4'-tert-butylphenyl]indenyl)zirconium dichloride, dimethylsilanediyl(2-isopropyl-4-[4'-tert-butylphenyl]-indenyl)-(2-ethyl-4-[4'-tert-butylphenyl]indenyl)zirconium dichloride, dimethylsilanediyl(2-isopropyl-4-[4'-tert-butylphenyl]indenyl)-(2-methyl-4-[3',5'-bis-tert-butylphenyl] indenyl)zirconium dichloride, dimethylsilanediyl(2-isopropyl-4-[4'-tert-butylphenyl]indenyl)-(2-methyl-4-[1'-naphthyl]indenyl)-zirconium dichloride and ethylene(2-isopropyl-4-[4'-tert-butylphenyl]indenyl)-(2-methyl-4-[4'-tert-butylphenyl]indenyl)zirconium dichloride, and also the corresponding dimethylzirconium, monochloromono(alkylaryloxy)zirconium and di(alkylaryloxy)zirconium compounds. The complexes are preferably used in the rac form.

Such complexes can be synthesized by methods known per se, preferably by reacting the appropriately substituted, cyclic hydrocarbon anions with halides of titanium, zirconium, hafnium, vanadium, niobium, tantalum or chromium. Examples of appropriate preparative methods are described, inter alia, in the Journal of Organometallic Chemistry, 369 (1989), 359-370.

Particularly useful compounds of the general formula (XIVd) are those in which
$M^{1D}$ is titanium or zirconium, in particular titanium, and
$X^D$ is chlorine, $C_1$-$C_4$-alkyl or phenyl or two radicals XD form a substituted or unsubstituted butadiene ligand,
$R^{15D}$

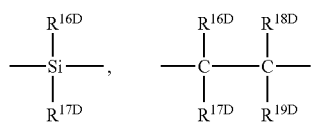

or $=BR^{16D}$ or $=BNR^{6D}R^{17D}$, $A^{1D}$ is 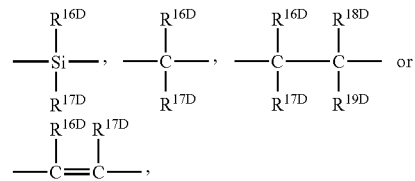

t is 1 or 2, preferably 2,
$R^{1D}$ to $R^{3D}$ and $R^{5D}$ are each hydrogen, $C_1$-$C_{10}$-alkyl, preferably methyl, $C_3$-$C_{10}$-cycloalkyl, $C_6$-$C_{15}$-aryl, $NR^{8D}_2$ or $Si(R^{8D})_3$, or two adjacent radicals form a cyclic group having from 4 to 12 carbon atoms, with particular preference being given to all $R^{1D}$ to $R^{3D}$ and $R^{5D}$ being methyl.

Particularly useful complexes D) of the formula (XIVd) are dimethylsilanediyl(tetramethylcyclopentadienyl)(phenylamino)titanium dichloride, dimethylsilanediyl(tetramethylcyclopentadienyl)-(benzylamino)titanium dichloride, dimethylsilanediyl(tetramethylcyclopentadienyl)(tert-butylamino)-titanium dichloride, dimethylsilanediyl (tetramethylcyclopentadienyl)(adamantyl)titanium dichloride and dimethylsilanediyl(indenyl)(tert-butylamino) titanium dichloride.

Another group of compounds of the formula (XIVd) which are particularly useful are those in which
$M^{1D}$ is titanium, vanadium or chromium, preferably in the oxidation state III, and
$X^D$ is chlorine, $C_1$-$C_4$-alkyl or phenyl or two radicals $X^D$ form a substituted or unsubstituted butadiene ligand,
$R^{15D}$ is

$A^{1D}$ is $-O-R^{22D}_2$, $-NR^{22D}_2$, $-PR^{22D}_2$ or an unsubstituted, substituted or fused, heterocyclic, in particular heteroaromatic, ring system,
v is 1 or when $A^{1D}$ is an unsubstituted, substituted or fused, heterocyclic ring system may be 0 or 1 and
$R^{1D}$ to $R^{3D}$ and $R^{5D}$ are each hydrogen, $C_1$-$C_{10}$-alkyl, $C_3$-$C_{10}$-cycloalkyl, $C_6$-$C_{15}$-aryl or $Si(R^{8D})_3$, or two adjacent radicals form a cyclic group having from 4 to 12 carbon atoms.

In a preferred embodiment, $A^{1D}$ is an unsubstituted, substituted or fused, heteroaromatic ring system and $M^{1D}$ is chromium. Very particular preference is given to $A^{1D}$ being an unsubstituted or substituted, e.g. alkyl-substituted, in particular substituted or unsubstituted quinolyl or pyridyl bound in position 8 or 2 and v being 0, e.g. 8-quinolyl, 8-(2-methylquinolyl), 8-(2,3,4-trimethylquinolyl), 8-(2,3,4,5,6,7-hexamethylquinolyl), v being 0 and $M^{1D}$ being chromium. Preferred catalysts D) of this type are 1-(8-quinolyl)-2-methyl-4-methylcyclopentadienylchromium(III) dichloride, 1-(8-quinolyl)-3-isopropyl-5-methylcyclopentadienylchromium (III) dichloride, 1-(8-quinolyl)-3-tert-butyl-5-methylcyclopentadienylchromium(III) dichloride, 1-(8-quinolyl)-2,3,4,5-tetramethylcyclopentadienylchromium (III) dichloride, 1-(8-quinolyl)tetrahydroindenylchromium (III) dichloride, 1-(8-quinolyl)indenylchromium(III) dichloride, 1-(8-quinolyl)-2-methylindenylchromium(III) dichloride, 1-(8-quinolyl)-2-isopropylindenylchromium(III) dichloride, 1-(8-quinolyl)-2-ethylindenyl-chromium(III)

dichloride, 1-(8-quinolyl)-2-tert-butylindenylchromium(III) dichloride, 1-(8-quinolyl)-benzindenylchromium(III) dichloride, 1-(8-quinolyl)-2-methylbenzindenylchromium (III) dichloride, 1-(8-(2-methylquinolyl))-2-methyl-4-methylcyclopentadienylchromium(III) dichloride, 1-(8-(2-methylquinolyl))-2,3,4,5-tetramethylcyclopentadienylchromium (III) dichloride, 1-(8-(2-methyl-quinolyl)) tetrahydroindenylchromium(III) dichloride, 1-(8-(2-methylquinolyl))indenylchromium(III) dichloride, 1-(8-(2-methylquinolyl))-2-methylindenylchromium(III) dichloride, 1-(8-(2-methyl-quinolyl))-2-isopropylindenylchromium(III) dichloride, 1-(8-(2-methylquinolyl))-2-ethylindenyl-chromium(III) dichloride, 1-(8-(2-methylquinolyl))-2-tert-butylindenylchromium(III) dichloride, 1-(8-(2-methylquinolyl)) benzindenylchromium(III) dichloride, 1-(2-pyridylmethyl) indenyl-chromium(III) dichloride or 1-(8-(2-methylquinolyl))-2-methylbenzindenylchromium(III) dichloride.

Furthermore, owing to the ease of preparation, preference is given to compounds in which $R^{15D}$ is CH=CH or 1,2-phenylene and $A^{1D}$ is $NR^{22D}{}_2$, and compounds in which $R^{15D}$ is $CH_2$, $C(CH_3)_2$ or $Si(CH_3)_2$ and $A^{1D}$ is unsubstituted or substituted 2- or 8-quinolyl or unsubstituted or substituted 2-pyridyl.

The preparation of such functional cyclopentadienyl ligands has been known for a long time. Various synthetic routes to these complexing ligands are described, for example, by M. Enders et al. in Chem. Ber. (1996), 129, 459-463, or P. Jutzi and U. Siemeling in J. Orgmet. Chem. (1995), 500, 175-185.

The metal complexes, in particular the chromium complexes, can be obtained in a simple manner by reacting the appropriate metal salts, e.g. metal chlorides, with the ligand anion (e.g. using methods analogous to the examples in DE-A-19710615).

Further suitable catalysts D) include metallocenes having at least one ligand which is formed from a cyclopentadienyl or heterocyclopentadienyl and a fused-on heterocycle, with the heterocycles preferably being aromatic and comprising nitrogen and/or sulfur. Such compounds are described, for example, in WO 98/22486. These are in particular dimethylsilanediyl(2-methyl-4-phenyl-indenyl)(2,5-dimethyl-N-phenyl-4-azapentalene)zirconium dichloride, dimethylsilanediylbis(2-methyl-4-phenyl-4-hydroazulenyl)zirconium dichloride, dimethylsilanediylbis(2-ethyl-4-phenyl-4-hydroazulenyl)zirconium dichloride, bis(2,5-dimethyl-N-phenyl-4-azapentalene)zirconium dichloride or (indenyl)(2,5-dimethyl-N-phenyl-4-azapentalene)zirconium dichloride.

Further suitable catalysts D) are systems in which a metallocene compound is combined with, for example, an inorganic oxide which has been treated with zirconium alkoxide and subsequently chlorinated, for example by means of carbon tetrachloride. The preparation of such systems is described, for example, in WO 01/41920.

Other suitable catalysts D) include imidochromium compounds in which chromium bears at least one imido group as structural feature. These compounds and their preparation are described, for example, in WO 01/09148.

Further suitable components D) include transition metal complexes with a tridentate macrocyclic ligand, in particular substituted and unsubstituted 1,3,5-triazacyclohexanes and 1,4,7-triazacyclononanes. In the case of this type of catalyst, preference is likewise given to chromium complexes. Preferred catalysts of this type are [1,3,5-tri(methyl)-1,3,5-triazacyclohexane]-chromium trichloride, [1,3,5-tri(ethyl)-1,3,5-triazacyclohexane]chromium trichloride, [1,3,5-tri-(octyl)-1,3,5-triazacyclohexane]chromium trichloride, [1,3,5-tri(dodecyl)-1,3,5-triazacyclohexane]-chromium trichloride and [1,3,5-tri(benzyl)-1,3,5-triazacyclohexane]chromium trichloride.

Further suitable catalysts D) are, for example, transition metal complexes with at least one ligand of the general formulae XV to XIX,

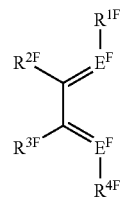

XV

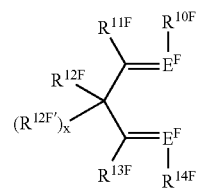

XVI

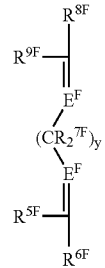

XVII

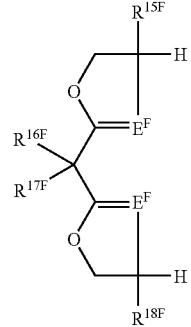

XVIII

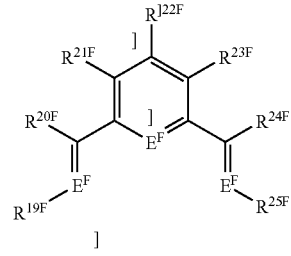

XIX where the transition metal is selected from among the elements Ti, Zr, Hf, Sc, V, Nb, Ta, Cr, Mo, W, Fe, Co, Ni, Pd, Pt and the elements of the rare earth metals. Preference is given to compounds having nickel, iron, cobalt or palladium as central metal.

$E^F$ is an element of group 15 of the Periodic Table of the Elements, preferably N or P, with particular preference being given to N. The two or three atoms $E^F$ in a molecule can be identical or different.

The radicals $R^{1F}$ to $R^{25F}$, which may be identical or different within a ligand system XV to XIX, are as follows:

| | |
|---|---|
| $R^{1F}$ and $R^{4F}$ | are each, independently of one another, a hydrocarbon radical or a substituted hydrocarbon radical, preferably a hydrocarbon radical in which the carbon atom adjacent to the element $E^F$ is bound to at least two carbon atoms, |
| $R^{2F}$ and $R^{3F}$ | are each, independently of one another, hydrogen, a hydrocarbon radical or a substituted hydrocarbon radical, where $R^{2F}$ and $R^{3F}$ may together also form a ring system in which one or more heteroatoms may also be present, |
| $R^{6F}$ and $R^{8F}$ | are each, independently of one another, a hydrocarbon radical or a substituted hydrocarbon radical, |
| $R^{5F}$ and $R^{9F}$ | are each, independently of one another, hydrogen, a hydrocarbon radical or a substituted hydrocarbon radical, |
| where $R^{6F}$ and $R^{5F}$ or $R^{8F}$ and $R^{9F}$ | may together also form a ring system, |
| the radicals $R^{7F}$ | are each, independently of one another, hydrogen, a hydrocarbon radical or a substituted hydrocarbon radical, where two $R^{7F}$ may together also form a ring system, |
| $R^{10F}$ and $R^{14F}$ | are each, independently of one another, a hydrocarbon radical or a substituted hydrocarbon radical, |
| $R^{11F}, R^{12F}, R^{12F'}$ and $R^{13F}$ | are each, independently of one another, hydrogen, a hydrocarbon radical or a substituted hydrocarbon radical, where two or more geminal or vicinal radicals $R^{11A}, R^{12A}, R^{12A'}$ and $R^{13A}$ may together also form a ring system, |
| $R^{15F}$ and $R^{18F}$ | are each, independently of one another, hydrogen, a hydrocarbon radical or a substituted hydrocarbon radical, |
| $R^{16F}$ and $R^{17F}$ | are each, independently of one another, hydrogen, a hydrocarbon radical or a substituted hydrocarbon radical, |
| $R^{19F}$ and $R^{25F}$ | are each, independently of one another, $C_2$-$C_{20}$-alkenyl, $C_6$-$C_{20}$-aryl, arylalkyl having from 1 to 10 carbon atoms in the alkyl radical and 6-20 carbon atoms in the aryl radical, where the organic radicals $R^{19F}$ and $R^{25F}$ may also be substituted by halogens, |
| $R^{20F}$-$R^{24F}$ | are each, independently of one another, hydrogen, $C_1$-$C_{20}$-alkyl, $C_2$-$C_{20}$-alkenyl, $C_6$-$C_{20}$-aryl, arylalkyl having from 1 to 10 carbon atoms in the alkyl radical and 6-20 carbon atoms in the aryl radical or $SiR^{26F}_3$, where the organic radicals $R^{20F}$-$R^{24F}$ may also be substituted by halogens and two vicinal radicals $R^{20F}$-$R^{24F}$ may also be joined to form a five- or six-membered ring and |
| the radicals $R^{26F}$ | are each, independently of one another, hydrogen, $C_1$-$C_{20}$-alkyl, $C_2$-$C_{20}$-alkenyl, $C_6$-$C_{20}$-aryl or arylalkyl having from 1 to 10 carbon atoms in the alkyl radical and 6-20 carbon atoms in the aryl radical and two radicals $R^{26F}$ may also be joined to form a five- or six-membered ring. |
| x | is 0 or 1, with the complex of the formula (XVI) being negatively charged when x is 0, and |
| y | is an integer from 1 to 4, preferably 2 or 3. |

Particularly useful transition metal complexes are those having Fe, Co, Ni, Pd or Pt as central metal and comprising ligands of the formula (XV). Particular preference is given to diimine complexes of Ni or Pd, e.g.:

Di(2,6-di-1-propylphenyl)-2,3-dimethyldiazabutadienepalladium dichloride, di(di-1-propylphenyl)-2,3-dimethyldiazabutadienenickel dichloride, di(2,6-di-1-propylphenyl)dimethyldiazabutadienedimethylpalladium, di(2,6-di-1-propylphenyl)-2,3-dimethydiazabutadienedimethynickel, di(2,6-di-methylphenyl)-2,3-dimethyldiazabutadienepalladium dichloride, di(2,6-dimethylphenyl)-2,3-dimethyldiazabutadienenickel dichloride, di(2,6-dimethylphenyl)-2,3-dimethyldiazabutadienedimethylpalladium, di(2,6-dimethylphenyl)-2,3-dimethyldiazabutadienedimethylnickel, di(2-methylphenyl)-2,3-dimethyldiazabutadienepalladium dichloride, di(2-methylphenyl)-2,3-dimethyldiazabutadienenickel dichloride, di(2-methylphenyl)-2,3-dimethyldiazabutadienedimethylpalladium, di(2-methylphenyl)-2,3-dimethyldiazabutadienedimethylnickel, diphenyl-2,3-dimethyldiazabutadienepalladium dichloride, diphenyl-2,3-dimethyldiazabutadienenickel dichloride, diphenyl-2,3-dimethyldiazabutadienedimethylpalladium, diphenyl-2,3-dimethyldiazabutadienedimethylnickel, di(2,6-dimethylphenyl)azanaphthenepalladium dichloride, di(2,6-dimethylphenyl)aza-naphthenenickel dichloride, di(2,6-dimethylphenyl)azanaphthenedimethylpalladium, di(2,6-dimethylphenyl)azanaphthenedimethylnickel, 1,1'-bipyridylpalladium dichloride, 1,1'-bipyridylnickel dichloride, 1,1'-bipyridyl(dimethyl)palladium, 1,1'-bipyridyl(dimethyl)nickel.

Particularly useful compounds (XIX) also include those which are described in J. Am. Chem. Soc. 120, p. 4049 ff. (1998), J. Chem. Soc., Chem. Commun. 1998, 849, and WO 98/27124. $E^F$ is preferably nitrogen and $R^{19F}$ and $R^{25F}$ in (XIX) are preferably phenyl, naphthyl, biphenyl, anthranyl, o-, m-, p-methylphenyl, 2,3-, 2,4-, 2,5- or 2,6-dimethylphenyl, -dichlorophenyl or -dibromophenyl, 2-chloro-6-methylphenyl, 2,3,4-, 2,3,5-, 2,3,6-, 2,4,5-, 2,4,6- or 3,4,5-trimethylphenyl, in particular 2,3- or 2,6-dimethylphenyl, -diisopropylphenyl, -dichlorophenyl or -dibromophenyl and 2,4,6-tri-methylphenyl. At the same time, $R^{20F}$ and $R^{24F}$ are preferably hydrogen, methyl, ethyl, n-propyl, isopropyl, n-butyl, tert-butyl, n-pentyl, n-hexyl, n-heptyl, n-octyl, benzyl or phenyl, in particular hydrogen or methyl. $R^{21F}$ and $R^{23F}$ are preferably hydrogen and $R^{22F}$ is preferably hydrogen, methyl, ethyl or phenyl, in particular hydrogen. Preference is given to complexes of the ligands F-XIX with the transition metals Fe, Co or Ni, in particular Fe. Particular preference is given to 2,6-diacetylpyridinebis(2,4-dimethylphenylimine) iron dichloride, 2,6-diacetylpyridinebis-(2,4,6-trimethylphenylimine)iron dichloride, 2,6-diacetylpyridinebis(2-chloro-6-methylphenylimine)-iron dichloride, 2,6-diacetylpyridinebis(2,6-diisopropylphenylimine)iron dichloride, 2,6-diacetylpyridinebis(2,6-dichlorophenylimine)iron dichloride, 2,6-pyridinedicarboxaldehydebis(2,6-diisopropylphenylimine)iron dichloride, 2,6-diacetylpyridinebis(2,4-dimethylphenylimine)cobalt dichloride, 2,6-diacetylpyridinebis(2,4,6-trimethylphenylimine)cobalt dichloride, 2,6-diacetylpyridinebis(2-chloro-6-methyl phenylimine)cobalt dichloride, 2,6-diacetylpyridinebis(2,6-diisopropylphenylimine)cobalt dichloride, 2,6-diacetylpyridinebis(2,6-dichlorophenylimine)cobalt dichloride, and 2,6-pyridinedicarboxaldehydebis(2,6-diisopropylphenylimine)cobalt dichloride.

Iminophenoxide complexes can also be used as catalysts D). The ligands of these complexes can be prepared, for example, from substituted or unsubstituted salicylaldehydes and primary amines, in particular substituted or unsubstituted arylamines. Transition metal complexes with pi ligands having one or more heteroatoms in the pi system, for example the boratabenzene ligand, the pyrrolyl anion or the phospholyl anion, can also be used as catalysts D).

Further complexes suitable as catalysts D) include those which have bidentate or tridentate chelating ligands. In such ligands, for example, an ether function is linked to an amine or amide function or an amide is linked to a heteroaromatic such as pyridine.

Such combinations of components A) and D) enable, for example, bimodal products to be prepared or comonomers to be generated in situ. Preference is given to using at least one monocyclopentadienyl complex A) in the presence of at least one further catalyst D) customary for the polymerization of olefins and if desired, one or more activating compounds C). Here, depending on the catalyst combinations A) and D), one or more activating compounds C) may be advantageous. The polymerization catalysts D) can likewise be supported and can be used simultaneously or in any order with the complex A) of the present invention. For example, the monocyclopentadienyl complex A) and the polymerization catalysts D) can be applied together to a support B) or different supports B). It is also possible to use mixtures of various catalysts as component D). The molar ratio of transition metal complex A) to polymerization catalyst D) is usually in the range from 1:100 to 100:1, preferably from 1:10 to 20:1 and particularly preferably from 1:1 to 10:1.

The catalyst system may further comprise, as additional component E), a metal compound of the general formula (XX),

where
$M^G$ is Li, Na, K, Be, Mg, Ca, Sr, Ba, boron, aluminum, gallium, indium, thallium, zinc, in particular Li, Na, K, Mg, boron, aluminum or Zn,
$R^{1G}$ is hydrogen, $C_1$-$C_{10}$-alkyl, $C_6$-$C_{15}$-aryl, alkylaryl or arylalkyl each having from 1 to 10 carbon atoms in the alkyl radical and from 6 to 20 carbon atoms in the aryl radical,
$R^{2G}$ and $R^{3G}$ are each hydrogen, halogen, $C_1$-$C_{10}$-alkyl, $C_6$-$C_{15}$-aryl, alkylaryl, arylalkyl or alkoxy each having from 1 to 20 carbon atoms in the alkyl radical and from 6 to 20 carbon atoms in the aryl radical, or alkoxy with $C_1$-$C_{10}$-alkyl or $C_6$-$C_{15}$-aryl,
$r^G$ is an integer from 1 to 3
and
$s^G$ and $t^G$ are integers from 0 to 2, with the sum $r^G+s^G+t^G$ corresponding to the valence of $M^G$, where the component E) is not identical to the component C). It is also possible to use mixtures of various metal compounds of the formula (XX).

Among the metal compounds of the general formula (XX), preference is given to those in which
$M^G$ is lithium, magnesium, boron or aluminum and
$R^{1G}$ is $C_1$-$C_{20}$-alkyl.

Particularly preferred metal compounds of the formula (XX) are methyllithium, ethyllithium, n-butyllithium, methylmagnesium chloride, methylmagnesium bromide, ethylmagnesium chloride, ethylmagnesium bromide, butylmagnesium chloride, dimethylmagnesium, diethylmagnesium, dibutylmagnesium, n-butyl-n-octylmagnesium, n-butyl-n-heptylmagnesium, in particular n-butyl-n-octylmagnesium, tri-n-hexylaluminum, triisobutylaluminum, tri-n-butylaluminum, triethyl-aluminum, dimethylaluminum chloride, dimethylaluminum fluoride, methylaluminum dichloride, methylaluminum sesquichloride, diethylaluminum chloride and trimethylaluminum and mixtures thereof. The partial hydrolysis products of aluminum alkyls with alcohols can also be used.

When a metal compound E) is used, it is preferably present in the catalyst system in such an amount that the molar ratio of MG from formula (XX) to transition metal from monocyclopentadienyl compound A) is from 2000:1 to 0.1:1, preferably from 800:1 to 0.2:1 and particularly preferably from 100:1 to 1:1.

In general, the catalyst solid together with the further metal compound E) of the general formula (XX), which may be different from the metal compound or compounds E) used in the preparation of the catalyst solid, is used as constituent of a catalyst system for the polymerization or copolymerization of olefins. It is also possible, particularly when the catalyst solid does not comprise any activating component C), for the catalyst system to further comprise, in addition to the catalyst solid, one or more activating compounds C) which are identical to or different from any activating compounds C) present in the catalyst solid.

To prepare the catalyst systems of the present invention, preference is given to immobilizing at least one of the components A) and/or C) on the support B) by physisorption or by means of chemical reaction, i.e. covalent binding of the components, with reactive groups of the support surface. The order in which the support component B), the component A) and any component C) are combined is immaterial. The components A) and C) can be added independently of one another or simultaneously or in premixed form to B). After the individual process steps, the solid can be washed with suitable inert solvents such as aliphatic or aromatic hydrocarbons.

In a preferred embodiment the monocyclopentadienyl complex A) is brought into contact with the activating compound C) in a suitable solvent, usually giving a soluble reaction product, an adduct or a mixture. The preparation obtained in this way is then brought into contact with the support B), which may have been pretreated, and the solvent is completely or partly removed. This preferably gives a solid in the form of a free-flowing powder. Examples of the industrial implementation of the above process are described in WO 96/00243, WO 98/40419 or WO 00/05277. A further preferred embodiment comprises firstly applying the activating compound C) to the support B) and subsequently bringing this supported activating compound into contact with the monocyclopentadienyl complex A).

The component D) can likewise be reacted in any order with the components A) and, if desired, B), C) and E). Preference is given to bringing D) firstly into contact with component C) and then dealing with the components A) and B) and any further C) as described above. In another preferred embodiment, a catalyst solid is prepared from the components A), B) and C) as described above and this is brought into contact with the component E) during, at the beginning of or shortly before the polymerization. Preference is given to E) firstly being brought into contact with the α-olefin to be polymerized and then the catalyst solid comprising the components A), B) and C) as described above subsequently being added.

The monocyclopentadienyl complex A) can be brought into contact with the component(s) C) and/or D) either before or after being brought into contact with the olefins to be polymerized. Preactivation using one or more components C) prior to mixing with the olefin and further addition of the same or different components C) and/or D) after the mixture has been brought into contact with the olefin is also possible. Preactivation is generally carried out at 10-100° C., in particular 20-80° C.

It is also possible for the catalyst system firstly to be prepolymerized with α-olefins, preferably linear $C_2$-$C_{10}$-1-alkenes and in particular ethylene or propylene, and the resulting prepolymerized catalyst solid then to be used in the actual polymerization. The mass ratio of catalyst solid used in the prepolymerization to monomer to be polymerized onto it is usually in the range from 1:0.1 to 1:1000, preferably from 1:1 to 1:200.

Furthermore, a small amount of an olefin, preferably an α-olefin, for example vinylcyclohexane, styrene or phenyldimethylvinylsilane, as modifying component, an antistatic or a suitable inert compound such as a wax or oil can be added as additive during or after the preparation of the catalyst system. The molar ratio of additives to transition metal compound B) is usually from 1:1000 to 1000:1, preferably from 1:5 to 20:1.

The catalyst systems of the invention are suitable for the polymerization of olefins and especially for the polymerization of α-olefins, i.e. hydrocarbons having terminal double bonds. Suitable monomers also include functionalized olefinically unsaturated compounds such as acrolein, ester or amide derivatives of acrylic or methacrylic acid, for example acrylates, methacrylates or acrylonitrile, or vinyl esters, for example vinyl acetate. Preference is given to nonpolar olefinic compounds, including aryl-substituted α-olefins. Particularly preferred α-olefins are linear or branched $C_2$-$C_{12}$-1-alkenes, in particular linear $C_2$-$C_{10}$-1-alkenes such as ethene, propene, 1-butene, 1-pentene, 1-hexene, 1-heptene, 1-octene, 1-decene or branched $C_2$-$C_{10}$-1-alkenes such as 4-methyl-1-pentene, conjugated and unconjugated dienes such as 1,3-butadiene, 1,5-hexadiene or 1,7-octadiene or vinylaromatic compounds such as styrene or substituted styrene. It is also possible to polymerize mixtures of various α-olefins. Preference is given to polymerizing at least one olefin selected from the group consisting of ethene, propene, 1-butene, 1-pentene, 1-hexene, 1-heptene, 1-octene and 1-decene.

Suitable olefins also include ones in which the double bond is part of a cyclic structure which can have one or more ring systems. Examples are cyclopentene, cyclohexene, norbornene, tetracyclododecene and methylnorbornene and dienes such as 5-ethylidene-2-norbornene, norbornadiene or ethylnorbornadiene.

Mixtures of two or more olefins can also be polymerized. In contrast to some known iron and cobalt complexes, the transition metal complexes of the present invention display a good polymerization activity even in the case of higher α-olefins, so that their suitability for copolymerization deserves particular emphasis. In particular, the transition metal complexes of the present invention can be used for the polymerization or copolymerization of ethene or propene. As comonomers in the polymerization of ethene, preference is given to using $C_3$-$C_8$-α-olefins or norbornene, in particular 1-butene, 1-pentene, 1-hexene and/or 1-octene. Preference is given to using monomer mixtures comprising at least 50 mol % of ethene. Preferred comonomers in the polymerization of propylene are ethene and/or butene.

The polymerization can be carried out in a known manner in bulk, in suspension, in the gas phase or in a supercritical medium in the customary reactors used for the polymerization of olefins. It can be carried out batchwise or preferably continuously in one or more stages. High-pressure polymerization processes in tube reactors or autoclaves, solution processes, suspension processes, stirred gas-phase processes or gas-phase fluidized-bed processes are all possible.

The polymerizations are usually carried out at from −60 to 350° C. under pressures of from 0.5 to 4000 bar at mean residence times of from 0.5 to 5 hours, preferably from 0.5 to 3 hours. The advantageous pressure and temperature ranges for carrying out the polymerizations usually depend on the polymerization method. In the case of high-pressure polymerization processes, which are usually carried out at pressures of from 1000 to 4000 bar, in particular from 2000 to 3500 bar, high polymerization temperatures are generally also set. Advantageous temperature ranges for these high-pressure polymerization processes are from 200 to 320° C., in particular from 220 to 290° C. In the case of low-pressure polymerization processes, a temperature which is at least a few degrees below the softening temperature of the polymer is generally set. These polymerization processes are preferably carried out at from 50 to 180° C., preferably from 70 to 120° C. In the case of suspension polymerization, the polymerization is usually carried out in a suspension medium, preferably an inert hydrocarbon such as isobutane or a mixture of hydrocarbons, or else in the monomers themselves. The polymerization temperatures are generally in the range from −20 to 115° C., and the pressure is generally in the range from 1 to 100 bar. The solids content of the suspension is generally in the range from 10 to 80%. The polymerization can be carried out batchwise, e.g. in stirring autoclaves, or continuously, e.g. in tube reactors, preferably in loop reactors. Particular preference is given to employing the Phillips PF process as described in U.S. Pat. No. 3,242,150 and U.S. Pat. No. 3,248,179. The gas-phase polymerization is generally carried out at from 30 to 125° C.

Among the abovementioned polymerization processes, particular preference is given to gas-phase polymerization, in particular in gas-phase fluidized-bed reactors, solution polymerization and suspension polymerization, in particular in loop reactors and stirred tank reactors. The gas-phase polymerization can also be carried out in the condensed or supercondensed phase, in which part of the circulating gas is cooled to below the dew point and is recirculated as a two-phase mixture to the reactor. It is also possible to use a multizone reactor in which two polymerization zones are linked to one another and the polymer is passed alternately through these two zones a number of times. The two zones can also have different polymerization conditions. Such a reactor is described, for example, in WO 97/04015. The different or identical polymerization processes can also, if desired, be connected in series so as to form a polymerization cascade, for example in the Hostalen process. A parallel reactor arrangement using two or more identical or different processes is also possible. Furthermore, molar mass regulators, for example hydrogen, or customary additives such as antistatics can also be used in the polymerizations.

The monocyclopentadienyl complexes of the invention and the catalyst systems in which they are present can also be prepared by means of combinations of methods or their polymerization activity can be tested with the aid of these combined methods.

The process of the invention allows polymers of olefins to be prepared. The term "polymerization" as used here in the description of the present invention encompasses both polymerization and oligomerization, i.e. oligomers and polymers having molar masses Mw in the range from about 56 to 10 000 000 can be produced by this process.

Owing to their good mechanical properties, the olefin polymers prepared using the catalyst system of the invention are particularly useful for the production of films, fibers and moldings.

The catalyst systems of the invention incorporate more comonomer than the same complexes in which the group A, in particular the imine group, is replaced by pyridine. In addition, the weight average molar mass is lower. This is particularly pronounced in systems having an imino group.

EXAMPLES

All syntheses and polymerizations were carried out under a nitrogen gas atmosphere using oxygen-free and water-free solvents. 2,6-Dim ethyl-N-(phenylethylidene)aniline, N-(1-phenylethylidene)-1H-pyrrol-1-amine and 2,6-di-isopropyl-N-(phenylethylidene)aniline were prepared as described in DE-A-10107045 (imine III.5, imine III.2 and imine III.1). 6,6-Dimethylfulvene is commercially available from Aldrich.

The density [g/cm³] was determined in accordance with ISO 1183.

The Staudinger index (η)[dl/g] was determined using an automatic Ubbelohde viscometer (Lauda PVS 1) in decalin as solvent at 130° C. (ISO1628 at 130° C., 0.001 g/ml of decalin).

The NMR spectra were measured on a Bruker DRX 200 (¹H, 200.13 MHz). In ¹H-NMR spectra, the signal of the incompletely deuterated part of the solvent used served as internal standard. All signals were calibrated to the appropriate literature values.

Mass spectra were recorded on a Finnigan MAT 8230, and high-resolution mass spectra were measured on a Micromass CTD ZAB-2F VH spectrometer.

Abbreviations in the tables below:
Cat. catalyst
t(Poly) polymerization time
Polymer amount of polymer formed
Density polymer density
Prod. productivity of the catalyst system in g of polymer obtained per mmol of catalyst (chromium complex) used per hour
Hexene whether or not hexene is present during the polymerization Example 1

Preparation of dichloro(3-cyclopentadienyl-3-methyl-1-phenylbutylidene-2,6-dimethylphenyl-amino)chromium(III)

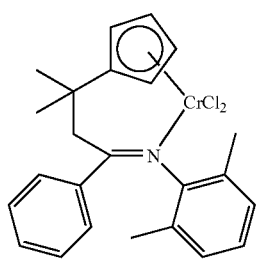

A solution of 159 mg of diisopropylamine (1.57 mmol) in 50 ml of absolute THF was cooled to −80° C. and n-butyllithium (862 µl of a 2 molar solution in pentane, 1.72 mmol) was subsequently added and the mixture was stirred for 30 minutes. 350 mg of 2,6-dimethyl-N-(phenylethylidene)-aniline (1.57 mmol) were added to this solution and the reaction mixture was stirred at −80° C. for two hours. The reaction mixture was allowed to warm to room temperature and was subsequently stirred for another two hours at room temperature. 166 mg of 6,6-dimethylfulvene (1.57 mmol) were then added to the resulting reaction mixture. After stirring at room temperature for 12 hours, 248 mg of anhydrous CrCl₃ (1.57 mmol) were added all at once and the reaction mixture was stirred at room temperature for 12 hours. The resulting greenish blue solution was evaporated to dryness under reduced pressure, the solid residue was washed twice with hexane and subsequently dried under reduced pressure. This gave 370 mg (52%) of dichloro-(3-cyclopenta-dienyl-3-methyl-1-phenyl-butylidene-2,6-dimethylphenylamino)chromium(III).

Example 2

Preparation of dichloro(3-cyclopentadienyl-3-methyl-1-phenylbutylidenepyrrol-1-ylamino)-chromium (III)

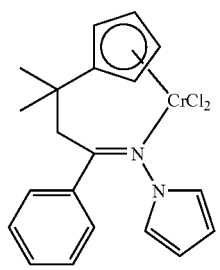

A solution of 192 mg of diisopropylamine (1.90 mmol) in 50 ml of absolute THF was cooled to −80° C., n-butyllithium (1.04 ml of a 2 molar solution in pentane, 2.09 mmol) were subsequently added and the mixture was stirred at −80° C. for a further 30 minutes. 350 mg of N-(1-phenylethylidene)-1H-pyrrole-1-amine (1.90 mmol) were added to this solution, the mixture was stirred at −80° C. for a further two hours and was then warmed to room temperature. It was stirred at room temperature for another two hours and 202 mg of 6,6-dimethylfulvene (1.90 mmol) were then added. After stirring at room temperature for 12 hours, 300 mg of anhydrous CrCl$_3$ (1.90 mmol) were added all at once and the reaction mixture was stirred at room temperature for another 12 hours. The resulting greenish blue solution was evaporated to dryness under reduced pressure, the solid residue was washed twice with absolute hexane and subsequently dried under reduced pressure. This gave 624 mg (80%) of dichloro-(3-cyclopentadienyl-3-methyl-1-phenylbutylidenepyrrol-1-ylamino)chromium(III).

Example 3

Preparation of dichloro(3-cyclopentadienyl-3-methyl-1-phenylbutan-1-one)chromium(III)

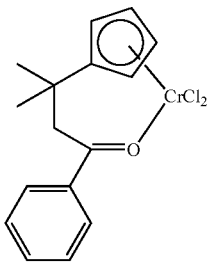

A solution of 434 mg of diisopropylamine (4.29 mmol) in 50 ml of absolute THF was cooled to −80° C., n-butyllithium (2.36 ml of a 2 molar solution in pentane, 4.72 mmol) was subsequently added and the mixture was stirred at −80° C. for a further 30 minutes. 515 mg of acetophenone (4.29 mmol) were added to this solution, the mixture was stirred at −80° C. for a further two hours and was then warmed to room temperature. It was stirred at room temperature for another two hours and 455 mg of 6,6-dimethylfulvene (4.29 mmol) were then added. After stirring at room temperature for 12 hours, 679 mg of anhydrous CrCl$_3$ (4.29 mmol) were added all at once and the reaction mixture was stirred at room temperature for another 12 hours. The resulting greenish brown solution was evaporated to dryness under reduced pressure, the solid residue was washed three times with absolute hexane and subsequently dried under reduced pressure. This gave 980 mg (66%) of dichloro(3-cyclopentadienyl-3-methyl-1-phenylbutan-1-one)chromium(III).

Example 4

Preparation of dichloro(3-cyclopentadienyl-3-methyl-1-phenylbutylidene-N-2,6-diisopropylphenylamino)chromium(III)

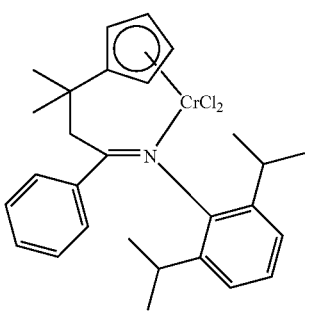

A solution of 73 mg of diisopropylamine (0.716 mmol) in 50 ml of absolute THF was cooled to −80° C. and n-butyllithium (394 μl of a 2 molar solution in pentane, 0.787 mmol) was subsequently added and the mixture was stirred for 30 minutes. 200 mg of 2,6-diisopropyl-N-(phenyl-ethylidene)aniline (0.716 mmol) were added to this solution and the reaction mixture was stirred at −80° C. for two hours. The reaction mixture was allowed to warm to room temperature and was subsequently stirred at room temperature for another two hours. 76 mg of 6,6-dimethylfulvene (0.716 mmol) were then added to the resulting reaction mixture. After stirring at room temperature for 12 hours, 113 mg of anhydrous CrCl$_3$ (0.716 mmol) were added all at once and the reaction mixture was stirred at room temperature for 12 hours. The resulting greenish blue solution was evaporated to dryness under reduced pressure, the solid residue was washed twice with hexane and subsequently dried under reduced pressure. This gave 100 mg (28%) of dichloro(3-cyclo-pentadienyl-3-methyl-1-phenylbutylidene-2,6-diisopropylphenylamino)chromium(III).

Examples 5-7

Polymerization

The polymerizations were carried out at 40° C. under argon in a 1 l four-necked flask provided with a contact thermometer, stirrer with Teflon blade, heating mantle and gas inlet tube. A solution of the amount indicated in table 1 of the appropriate complex in 250 ml of toluene was heated at 75° C. for 10 minutes, then cooled back down to 40° C. and the appropriate amount of MAO (10% strength solution in toluene from Crompton; for Cr:Al, see table 1) was subsequently added and the mixture was heated at 40° C. on a water bath.

In the case of the ethylene homopolymerizations, ethylene was passed through at atmospheric pressure at a flow rate of from about 20 to 40 l/h. In the case of the ethylene copolymerizations, 3 ml of hexene was placed in the polymerization vessel before the addition of ethylene and about 40 l/h of ethylene were subsequently passed through at atmospheric pressure for 20 minutes.

After maintaining a constant ethylene flow for the time indicated in table 1, the polymerization was stopped by addition of methanolic HCl solution (15 ml of concentrated hydrochloric acid in 50 ml of methanol). After stirring for 15 minutes, 250 ml of methanol were added and the white polymer formed was filtered off, washed with methanol and dried at 70° C. under reduced pressure. The polymerization and product data are summarized in table 1.

TABLE 1

| | | | | Polymerization results | | | | |
|---|---|---|---|---|---|---|---|---|
| Ex. | Cat. from Ex. | Amount of cat. [μmol] | Cr:Al | t(poly) [min] | Polymer [g] | Prod. [g/(mmol M · h)] | η [dl/g] | $M_w$ |
| 5 | 1 | 26.7 | 1:500 | 20 | 3.12 | 350 | 0.503 | 4408 |
| 6 | 2 | 31.3 | 1:500 | 15 | 11.7 | 1496 | 0.493 | 6088 |
| 7* | 2 | 41.2 | 1:500 | 15 | 10.65 | 1033 | 0.402 | 5760 |

*ethylene copolymerization with 1-hexene (2.7% by weight of hexene incorporated)

The invention claimed is:

1. A monocyclopentadienyl complex comprising a structural element of general formula (IV)

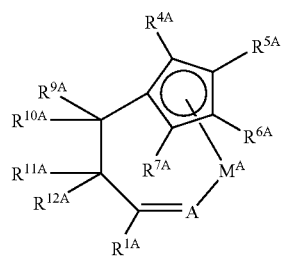

(IV)

wherein:

A is $NR^{2A}$;

$R^{1A}$-$R^{2A}$ are each, independently of one another, hydrogen, a $C_1$-$C_{22}$-alkyl, a $C_2$-$C_{22}$-alkenyl, a $C_6$-$C_{22}$-aryl, an arylalkyl comprising from 1 to 10 carbon atoms in the alkyl radical and 6-20 carbon atoms in the aryl radical, $NR^{3A}{}_2$, $N(SiR^{3A}{}_3)_2$, $OR^{3A}$, $OSiR^{3A}{}_3$, or $SiR^{3A}{}_3$, wherein $R^{1A}$-$R^{2A}$ are optionally substituted by at least one halogen, and two $R^{1A}$-$R^{2A}$ are optionally joined to form a five-, six- or seven-membered, nonaromatic ring;

$R^{3A}$ are each, independently of one another, hydrogen, a $C_1$-$C_{20}$-alkyl, a $C_2$-$C_{20}$-alkenyl, a $C_6$-$C_{20}$-aryl, or an arylalkyl comprising from 1 to 10 carbon atoms in the alkyl radical and 6-20 carbon atoms in the aryl radical, wherein $R^{3A}$ are optionally substituted by at least one halogen, and two $R^{3A}$ are optionally joined to form a five- or six-membered ring;

$R^{4A}$-$R^{7A}$ are each, independently of one another, hydrogen, a $C_1$-$C_{22}$-alkyl, a $C_2$-$C_{22}$-alkenyl, a $C_6$-$C_{22}$-aryl, an arylalkyl comprising from 1 to 10 carbon atoms in the alkyl radical and 6-20 carbon atoms in the aryl radical, $NR^{8A}{}_2$, $N(SiR^{8A}{}_3)_2$, $OR^{8A}$, $OSiR^{8A}{}_3$, $SiR^{8A}{}_3$, or $BR^{8A}{}_2$, wherein $R^{4A}$-$R^{7A}$ are optionally substituted by at least one halogen, and two $R^{4A}$-$R^{7A}$ are optionally joined to form a five-, six- or seven-membered ring, and/or two $R^{4A}$-$R^{7A}$ are optionally joined to form a five-, six- or seven-membered heterocycle comprising at least one atom from the group consisting of N, P, O and S;

$R^{8A}$ are each, independently of one another, hydrogen, a $C_1$-$C_{20}$-alkyl, a $C_2$-$C_{20}$-alkenyl, a $C_6$-$C_{20}$-aryl, or an arylalkyl comprising from 1 to 10 carbon atoms in the alkyl radical and 6-20 carbon atoms in the aryl radical, wherein $R^{8A}$ are optionally substituted by at least one halogen, and two $R^{8A}$ are optionally joined to form a five- or six-membered ring;

$R^{9A}$-$R^{12A}$ are each, independently of one another, hydrogen, a $C_1$-$C_{20}$-alkyl, a $C_2$-$C_{20}$-alkenyl, a $C_6$-$C_{20}$-aryl, an arylalkyl comprising from 1 to 10 carbon atoms in the alkyl radical and 6-20 carbon atoms in the aryl radical, or $SiR^{15A}{}_3$, wherein $R^{9A}$-$R^{12A}$ are optionally substituted by at least one halogen, and two $R^{9A}$-$R^{12A}$ are optionally joined to form a five- or six-membered, nonaromatic ring; and $R^{15A}$ are each, independently of one another, hydrogen, a $C_1$-$C_{20}$-alkyl, a $C_2$-$C_{20}$-alkenyl, a $C_6$-$C_{20}$-aryl, an arylalkyl comprising from 1 to 10 carbon atoms in the alkyl radical and 6-20 carbon atoms in the aryl radical, a $C_1$-$C_{10}$ alkoxy or a $C_6$-$C_{10}$ aryloxy, and two $R^{15A}$ are optionally joined to form a five- or six-membered ring; and $M^A$ is a metal selected from the group consisting of titanium in an oxidation state 3, vanadium, chromium, molybdenum and tungsten.

2. The monocyclopentadienyl complex according to claim 1, wherein A is a group of formula (III)

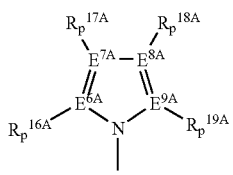

(III)

wherein $E^{6A}$-$E^{9A}$ are each, independently of one another, carbon or nitrogen;

$R^{16A}$-$R^{19A}$ are each, independently of one another, hydrogen, a $C_1$-$C_{22}$-alkyl, a $C_2$-$C_{22}$-alkenyl, a $C_6$-$C_{22}$-aryl, an arylalkyl comprising from 1 to 10 carbon atoms in the alkyl radical and 6-20 carbon atoms in the aryl radical, $NR^{20A}{}_2$, $N(SiR^{20A}{}_3)_2$, $OR^{20A}$, $OSiR^{20A}{}_3$, $SR^{20A}$, or $SiR^{20A}{}_3$, wherein $R^{16A}$-$R^{19A}$ are optionally substituted by at least one halogen, and two $R^{16A}$-$R^{19A}$ are optionally joined to form a five-, six- or seven-membered ring, and/or two $R^{16A}$-$R^{19A}$ are optionally joined to form a five-, six- or seven-membered heterocycle comprising at least one atom from the group consisting of N, P, O and S;

$R^{20A}$ are each, independently of one another, hydrogen, a $C_1$-$C_{20}$-alkyl, a $C_2$-$C_{20}$-alkenyl, a $C_6$-$C_{20}$-aryl, or an arylalkyl comprising from 1 to 10 carbon atoms in the alkyl radical and 6-20 carbon atoms in the aryl radical, wherein $R^{20A}$ are optionally substituted by at least one halogen, and two $R^{20A}$ are optionally joined to form a five- or six-membered ring;

p is 0 when $E^{6A}$-$E^{9A}$ is nitrogen, and is 1 when $E^{6A}$-$E^{9A}$ is carbon.

3. A catalyst system for olefin polymerization comprising:
A) at least one monocyclopentadienyl complex according to claim 1;

B) optionally, an organic or inorganic support;
C) optionally, at least one activating compound;
D) optionally, at least one additional catalyst for olefin polymerization; and
E) optionally, at least one metal compound comprising a metal of group 1, 2 or 13 of the Periodic Table.

4. A prepolymerized catalyst system comprising the catalyst system according to claim 3, further comprising at least one linear $C_2$-$C_{10}$ 1-alkene polymerized onto the prepolymerized catalyst system in a mass ratio of from 1:0.1 to 1:1000 based on the catalyst system to monomer to be polymerized.

5. A process for preparing polyolefins by polymerization or copolymerization of olefins in presence of the catalyst system according to claim 3.

* * * * *